United States Patent
Chen et al.

(10) Patent No.: US 10,859,169 B2
(45) Date of Patent: *Dec. 8, 2020

(54) VALVE SEAT DRIVEN FORCED SEAL BALL VALVE

(71) Applicant: Zibo Votaisi Petrochemical Equipment Co., Ltd, Zibo (CN)

(72) Inventors: Jimeng Chen, Zibo (CN); Xiaoqi Liu, Cambridge (GB)

(73) Assignee: Zibo Votaisi Petrochemical Equipment Co., Ltd, Zibo (CN)

(*) Notice: Subject to any disclaimer, the term of this patent is extended or adjusted under 35 U.S.C. 154(b) by 0 days.

This patent is subject to a terminal disclaimer.

(21) Appl. No.: 16/516,331

(22) Filed: Jul. 19, 2019

(65) Prior Publication Data

US 2019/0338857 A1  Nov. 7, 2019

Related U.S. Application Data

(63) Continuation of application No. PCT/CN2019/079471, filed on Mar. 25, 2019, and a continuation of application No. 15/872,000, filed on Jan. 16, 2018, now Pat. No. 10,415,711, which is a continuation of application No. 15/678,507, filed on Aug. 16, 2017, now Pat. No. 9,903,483, which is a continuation of application No. PCT/CN2017/080179, filed on Apr. 12, 2017.

(30) Foreign Application Priority Data

May 26, 2016 (CN) .................... 2016 2 0491127 U
Feb. 1, 2018 (CN) ......................... 2018 1 0100650

(51) Int. Cl.
*F16K 5/20* (2006.01)
*F16K 31/53* (2006.01)

(52) U.S. Cl.
CPC ............ *F16K 5/204* (2013.01); *F16K 31/535* (2013.01)

(58) Field of Classification Search
CPC ....... F16K 5/201; F16K 5/0605; F16K 31/535
USPC ........................................................ 251/248
See application file for complete search history.

(56) References Cited

U.S. PATENT DOCUMENTS 3,033,513 A    5/1962  Vulliez
3,254,873 A *  6/1966  Knox .................... F16K 3/205
                                                        251/171

(Continued)

FOREIGN PATENT DOCUMENTS

FR            2044118 A5 *  2/1971  ............ F16K 5/201

*Primary Examiner* — Reinaldo Sanchez-Medina
*Assistant Examiner* — David Colon-Morales
(74) *Attorney, Agent, or Firm* — Larson & Larson, P.A.; Justin P. Miller; Frank Liebenow

(57) ABSTRACT

The disclosure relates to a valve seat driven forced seal ball valve including a valve body, a first seat, a ball and a stem. The stem drives the ball to rotate between an open and a closed positions. The stem also drives the first seat towards and away from the ball. When the ball is in closed position, the first seat presses against the ball to achieve a forced seal. The first seat is driven towards and away from the ball by a first seat drive ring. The first seat drive ring is provided with female threads and the first seat is provided with male threads. The first drive ring drives the first seat towards and away from the ball by a screw connection.

17 Claims, 19 Drawing Sheets

(56) References Cited

U.S. PATENT DOCUMENTS

| | | | | |
|---|---|---|---|---|
| 3,653,631 | A * | 4/1972 | Hurst | F16K 5/201 |
| | | | | 251/159 |
| 4,266,566 | A * | 5/1981 | Kacal | F16K 5/201 |
| | | | | 137/316 |
| 4,366,946 | A * | 1/1983 | Roark | F16K 5/201 |
| | | | | 251/159 |
| 5,253,843 | A * | 10/1993 | Garceau | F16K 5/201 |
| | | | | 251/159 |
| 5,417,404 | A | 5/1995 | Varden | |
| 5,676,347 | A * | 10/1997 | Knox | F16K 5/201 |
| | | | | 251/170 |
| 6,378,841 | B1 | 4/2002 | Russell | |
| 6,681,793 | B2 * | 1/2004 | Mike | F16K 5/0636 |
| | | | | 137/15.22 |
| 7,740,228 | B2 | 6/2010 | Simpson | |
| 9,903,483 | B2 | 2/2018 | Liu | |
| 2017/0299072 | A1 * | 10/2017 | Hawa | F16K 5/201 |
| 2020/0041010 | A1 * | 2/2020 | Chen | F16K 5/204 |

* cited by examiner

VALVE SEAT DRIVEN FORCED SEAL BALL VALVE

CROSS-REFERENCE TO RELATED APPLICATION

This application is a continuation of U.S. patent application Ser. No. 15/872,000, filed Jan. 16, 2018, titled "A mechanical energized sealing ball valve with single stem," and a continuation of PCT/CN2019/079471, filed Mar. 25, 2019, titled "Valve seat driven forced seal ball valve," that claims priority to China application number 201810100650.1, filed Feb. 1, 2018, title translated as "Valve seat driven forced seal ball valve."

U.S. patent application Ser. No. 15/872,000 is in turn a continuation of U.S. patent application Ser. No. 15/678,507, filed Aug. 16, 2017, titled "A mechanical energized sealing ball valve", issued as U.S. Pat. No. 9,903,483, which a continuation of PCT application number PCT/CN2017/080179, filed Apr. 12, 2017, title translated as "Forced Sealing Ball Valve," which in turn claims priority to China application number ZL 2016 20491127.2, filed May 26, 2016, title translated as "Forced Sealing Ball Valve."

FIELD

The disclosure pertains to ball valves, and more particularly to a valve seat driven forced seal ball valve.

BACKGROUND

In the field of fluid control, such as oil and gas production process switching, pipeline shut-off, metering, pressure regulation, molecular sieve switching, compressor inlet and outlet, hydrogen application in refinery processes, air separation of ammonia plant, etc., which require frequent operations and rigorous control over fluid switching and the tightness of closure, the valve is required to produce a pressure drop as small as possible in a through-conduit port and to provide a forced torque seal that is unaffected by the line pressure. Forced seal ball valves are recognized as the ideal solution.

However, the traditional rising stem ball valve adopts the rising stem orbit guiding design. Although the valve can be friction free for most of the valve stroke, relative sliding friction between the ball and the valve seat sealing surface still exists at the final seating stage, making the rotation not friction free. The forced engagement between the ball and the valve seat is completed by the pressing of wedged surface of the stem and the cooperation of the lower shaft of the ball. This action process is not stable enough and is easily affected by the accuracy of relative positions of the valve seat and the ball rotating shaft. The stem and its assembly are complicated. The switching process combines both the linear stroke and angular stroke motions.

Machining precision is highly required. Stem leakage is prone to occur. Besides, the stroke time is long.

What is needed is a ball valve that sequentially operates a ball while extending and retracing a sealing surface.

SUMMARY

The purpose of the disclosure is to propose a technical solution for a valve seat driven forced seal ball valve, to improve valve stability and reliability, and improve the performance of the forced seal ball valve.

In order to achieve the above object, the technical solution of the disclosure is: a valve seat driven forced seal ball valve comprises a valve body, a first seat, a ball and a stem, the stem drives the ball to rotate between open and closed positions, and the stem also drives the first seat to move inward and outward with respect to the ball. When the ball reaches closed position, the stem drives the seat to press against the ball to achieve a forced seal.

Further, the first seat is driven inward and outward with respect to the ball by a first seat drive ring. The stem drives the first seat drive ring to rotate. The first seat drive ring has female threads, and the first seat has male threads. The first seat drive ring drives the first seat inward and outward with respect to the ball via the threads.

Further, in order to reduce the friction between the first seat drive ring and the first seat, the female threads of the first seat drive ring and the male threads of the first seat are equipped with rollers and a cage, the rollers are disposed in the cage, and simultaneously meshed with the female threads of the first seat drive ring and male threads of the first seat.

Further, the stem drives the ball to close via a locking object. When the ball rotates from the open position to the closed position, the locking object locks the stem and the ball so that the stem drives the ball to rotate, and when the ball reaches the closed position, the locking object unlocks the stem and the ball, and locks the ball in the closed position so that the stem continues to rotate and drive the first seat to move towards the ball and press against the ball. When the valve seat driven forced seal ball valve opens, the stem drives the first seat to move away from the ball, and the locking object unlocks the ball from the closed position and locks the stem and the ball so that the stem drives the ball to rotate to the open position.

Further, a driving structure between the stem and the ball and the first seat is that the stem is provided with a first pinion and a second pinion. The first seat drive ring is provided with a first gear. The first pinion is meshed with the first gear. The ball is provided with a ball upper sleeve, and an inner hole of the ball upper sleeve is rotatably matched with an upper shaft. A third gear is mounted on the outer cylindrical surface of the ball upper sleeve. The second pinion is meshed with the third gear. A first through hole is set in the ball upper sleeve wall. A first recessed hole with its position corresponding to the first through hole is set inside the shaft hole of the third gear. The outer cylindrical surface of the upper shaft is provided with a second recessed hole with its position corresponding to the first through hole. The locking object is positioned in the first through hole with a clearance fit. The length of the locking object is greater than the wall thickness of the ball upper sleeve. The third gear is provided with a driving block for driving the ball to rotate to open direction.

Further, the locking object is a cylindrical pin or a ball pin with ball heads at both ends. The first through hole is a passage corresponding to the cylindrical outer diameter of the locking object. The first recessed hole of the third gear is a spherical recessed hole corresponding to the ball end of the locking object. The second recessed hole of the upper shaft is a spherical recessed hole corresponding to the ball end of the locking object.

Further, the locking object is a cylindrical pin with ball heads at both ends. The axis of the locking object is parallel to the rotation axis of the stem. The first through hole of the ball upper sleeve is a long hole corresponding to the profile of the locking object. The first recessed hole of the third gear is a long recessed hole corresponding to the profile of the locking object. The second recessed hole of the upper shaft is a long recessed hole corresponding to the profile of the locking object. The cylindrical diameter of the locking object is larger than the wall thickness of the ball upper sleeve.

Further, the locking object is a cylindrical pin with tapered heads at both ends. The first recessed hole of the third gear is a tapered recessed hole corresponding to the tapered head of the locking object.

The second recessed hole of the upper shaft is a tapered recessed hole corresponding to the tapered head of the locking object.

Further, in order to simultaneously seal the valve seat of the medium inlet and the medium outlet, the valve seat driven forced seal ball valve is provided with a second seat and a second seat drive ring. The second seat drive ring is provided with a second gear. The second gear meshes with a fourth pinion. The fourth pinion rotates coaxially with a fifth pinion. The fifth pinion meshes with the third gear. The first seat and the second seat both press against the ball when the valve seat driven forced seal ball valve closes.

Further, another driving structure between the stem and the ball and the first seat is that the stem is coaxial with the ball shaft. The stem is provided with a sixth gear. The sixth gear is rotatably mounted in a bearing housing. The sixth gear meshes with a seventh gear. The first seat drive ring is provided with a first gear. The first gear is meshed with an eighth gear. The seventh gear and the eighth gear rotate coaxially and synchronously. The ball is provided with a ball upper shaft. The sixth gear is rotatably mounted in the ball upper shaft. The top of the ball upper shaft is provided with a convex block. The inner hole of the sixth gear is provided with a driving block for driving the ball to rotate towards the opening direction. The ball is provided with a ball driving plate. The ball driving plate is provided with a second through hole. The top of the sixth gear is provided with a third recessed hole with its position corresponding to the second through hole. The bottom of the bearing housing is provided with a fourth recessed hole with its position corresponding to the second through hole. The locking object is positioned in the second through hole with a clearance fit. The locking object is larger than the thickness of the ball driving plate.

Further, the locking object has a first end face and a second end face. The first recessed hole of the third gear includes a first mating surface for mating with the first end surface; and the second recessed hole of the upper shaft includes a second mating face for mating with the second end face. Wherein, when the first end surface touches the first mating surface, the first mating surface applies a first component force in the direction of the axis of the first through hole to push the locking object out of the recessed hole, and a second component force that is perpendicular to the axis of the first through hole.

Further, the first end surface is a hemispherical convex surface; and the first mating surface is a hemispherical concave surface.

Further, the second end surface is a hemispherical convex surface; and the second mating surface is a hemispherical concave surface.

Further, the first end surface is a conical convex surface; the first mating surface is a conical concave surface.

Further, the second end surface is a conical convex surface; and the second mating surface is a conical concave surface.

Further, the valve seat driven forced seal ball valve includes a rotation stopper placed between the first seat and the valve body.

Further, the rotation stopper extends in a reciprocating direction of the first seat; the rotation stopper is inserted in the valve body or the first seat.

The disclosure has the benefits effects that the movable valve seat is used to achieve the forced sealing of the ball valve, thereby reducing the structural complexity; the locking object is used to control the connection relationship between the stem and the ball and the first seat, thereby achieving the operation of the ball valve on/off and forced seal by a single stem, and the operation is convenient, and the operation stability and reliability are good.

The disclosure will be described in detail below with reference to the accompanying drawings and embodiments.

BRIEF DESCRIPTION OF THE DRAWINGS

The invention can be best understood by those having ordinary skill in the art by reference to the following detailed description when considered in conjunction with the accompanying drawings in which.

DETAILED DESCRIPTION

Figure 1:
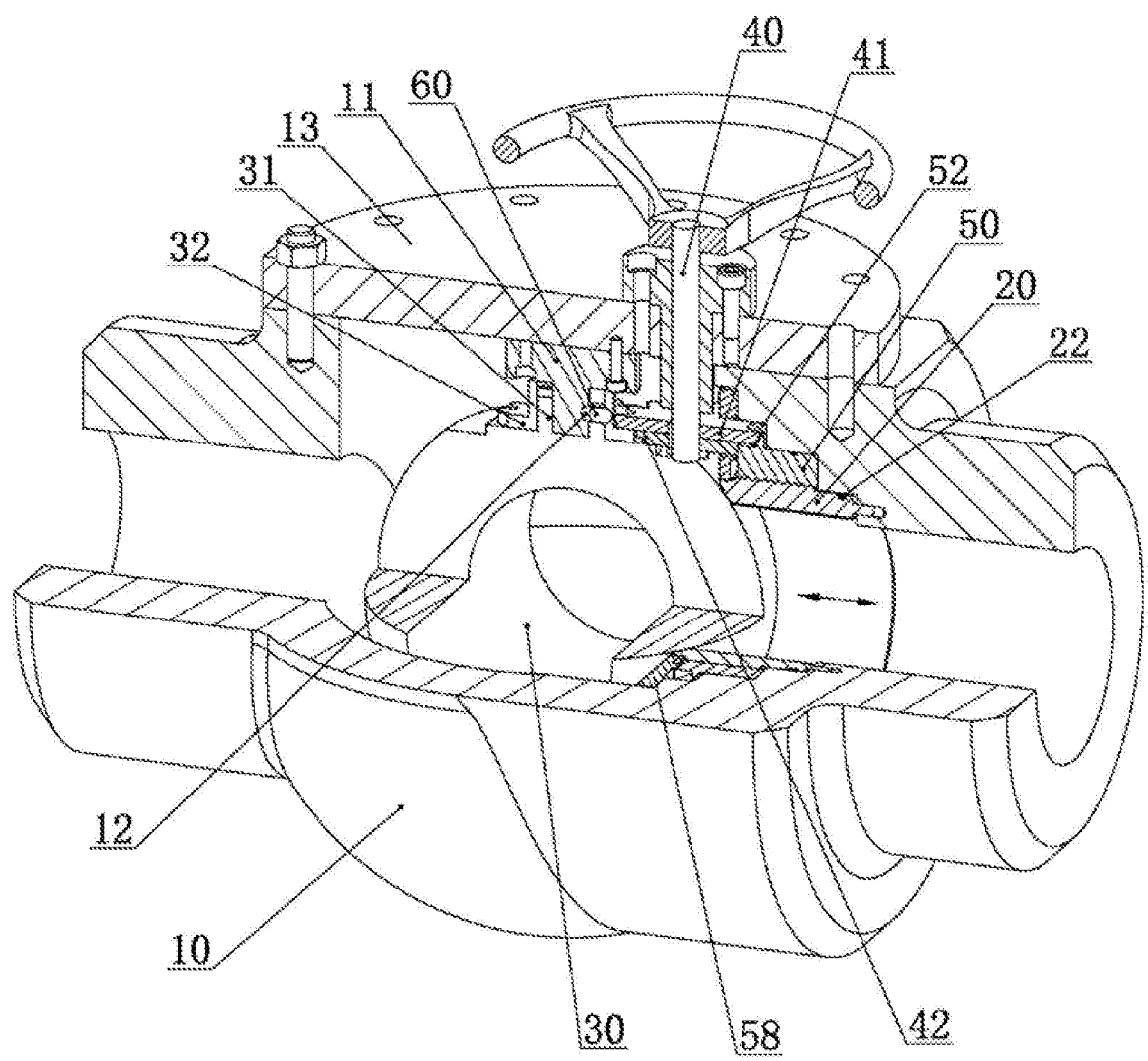
FIG. 1 is an overall structural view of the disclosure, the locking object is a cylindrical pin with a ball end at both ends.
Figure 2:
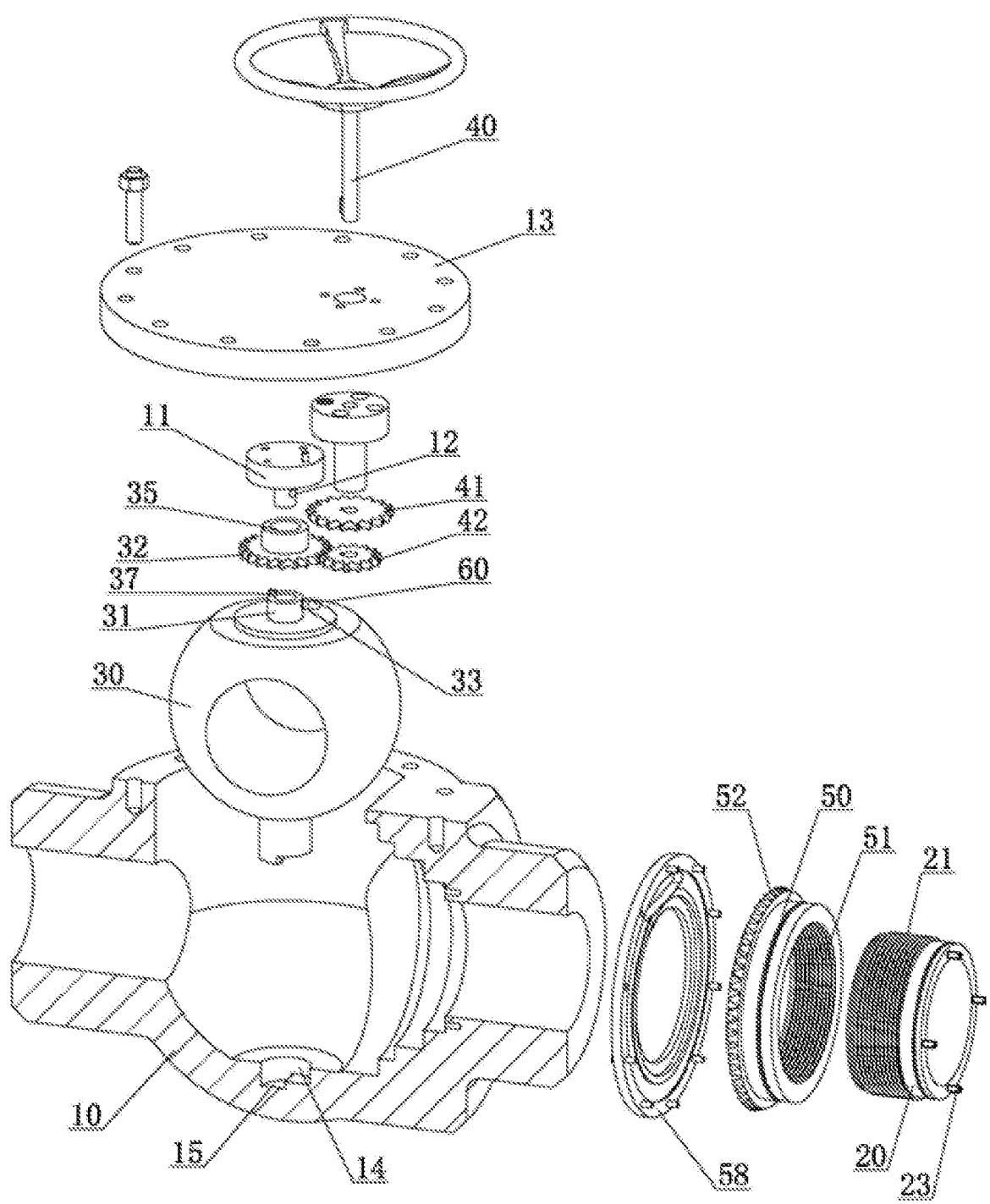
FIG. 2 is an exploded view of the structure of the disclosure.

Reference will now be made in detail to the presently preferred embodiments of the invention, examples of which are illustrated in the accompanying drawings. Throughout the following detailed description, the same reference numerals refer to the same elements in all figures.

As shown in FIGS. 1 to 10, a valve seat driven forced seal ball valve includes a valve body 10, a first seat 20, a ball 30 and a stem 40, and the stem drives the ball to rotate between open and closed position, the stem also drives the first seat to move inward and outward with respect to the ball, and when the ball reaches closed position, it drive the seat to press against the ball to achieve a forced seal.

The first seat is driven inward and outward with respect to the ball by a first seat drive ring 50, and the stem drives the first seat drive ring to rotate. The first seat drive ring is provided with a female thread 51. The first seat is provided with a male thread 21, and the first seat drive ring drives the first seat inward and outward with respect to the ball by a screw connection.

Figure 10:
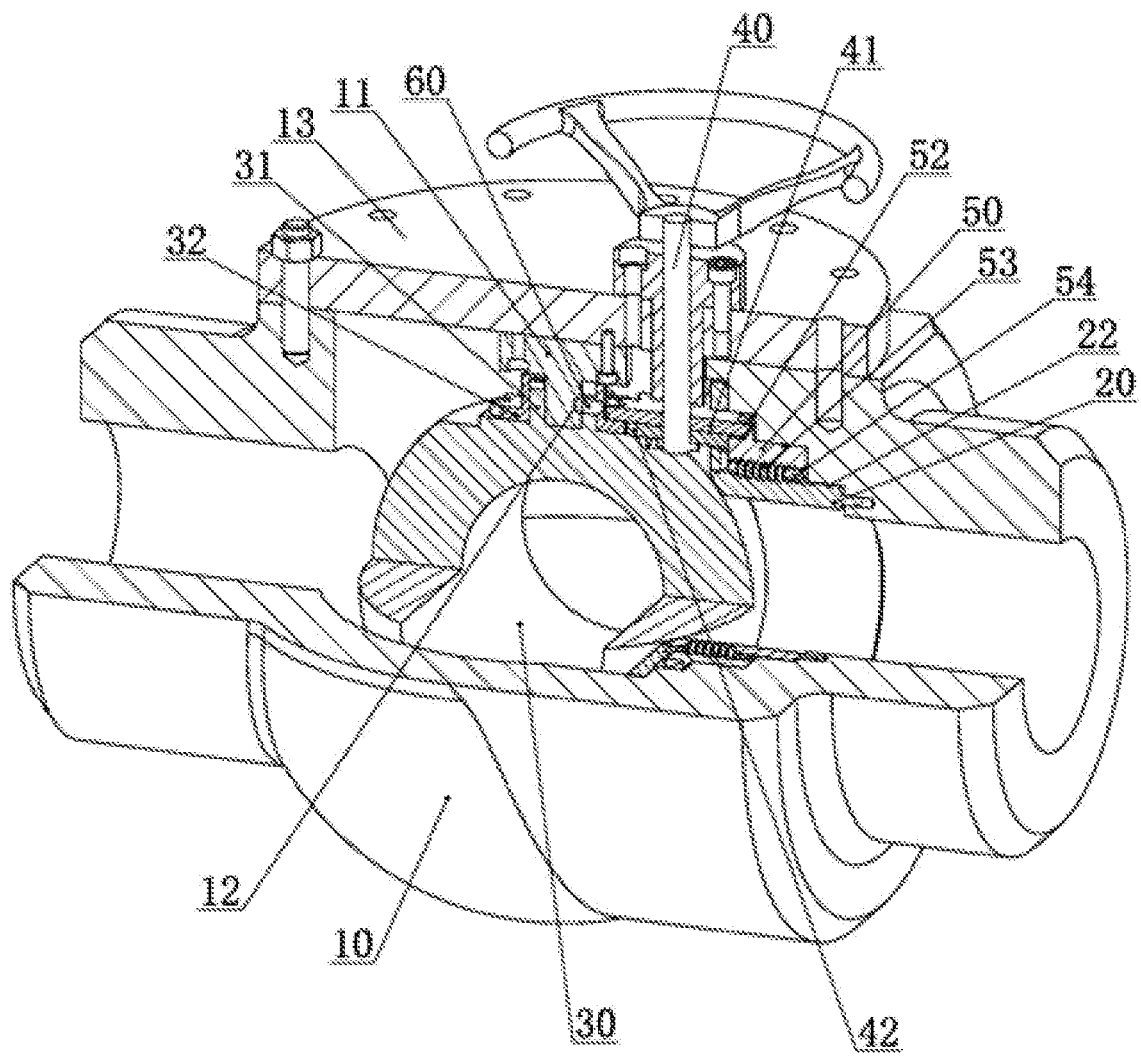
FIG. 10 is a structural view showing a toothed roller between the valve seat and the valve seat drive ring.

As shown in FIG. 10, a roller 53 and a cage 54 are disposed between the female thread of the first seat drive ring and the male thread of the first seat, and the roller is disposed in the cage. The roller simultaneously meshes with the female threads of the first seat drive ring and the male threads of the first seat.

Figure 4:
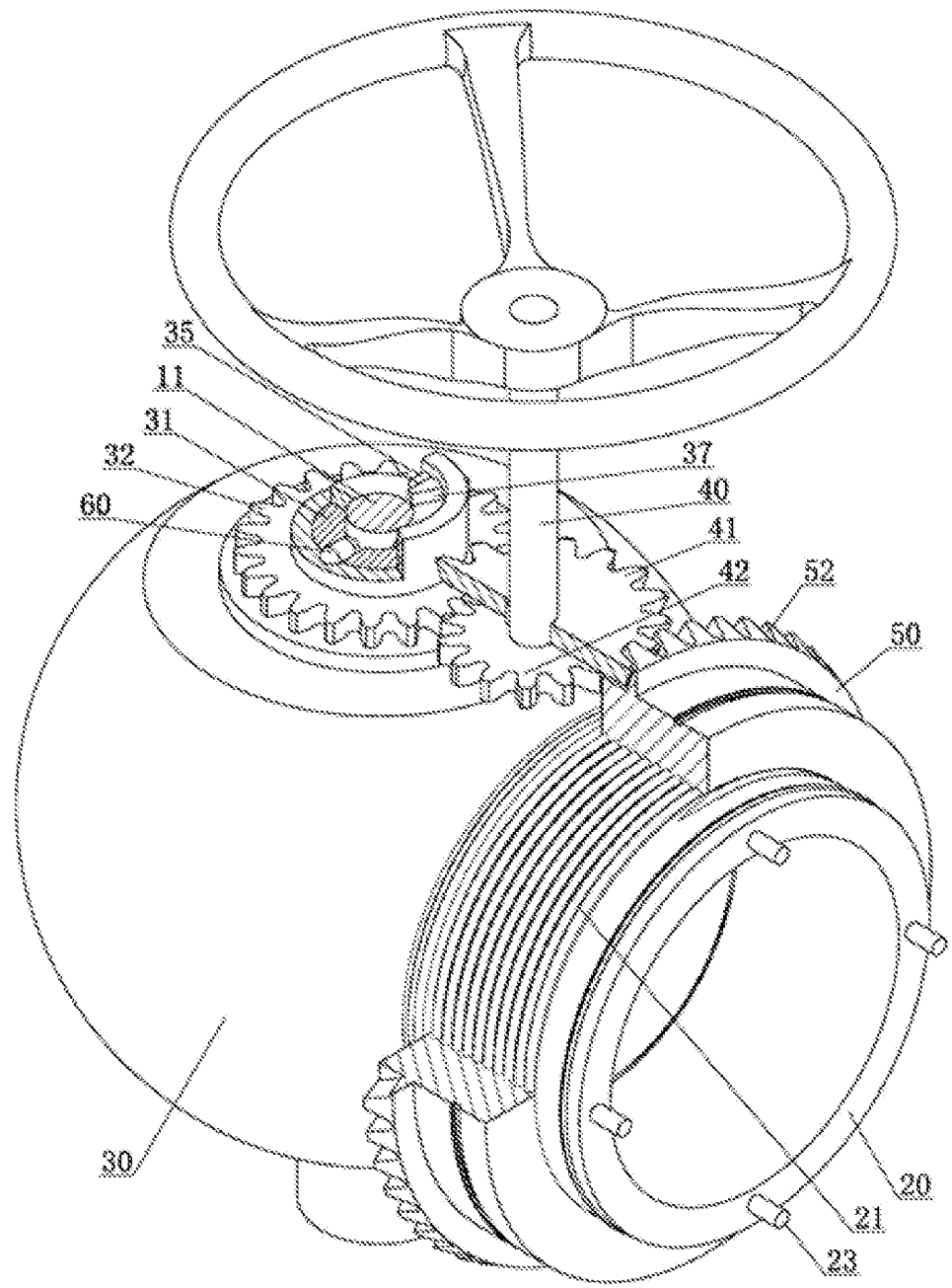
FIG. 4 is a schematic view showing the ball open of the disclosure.
Figure 5:
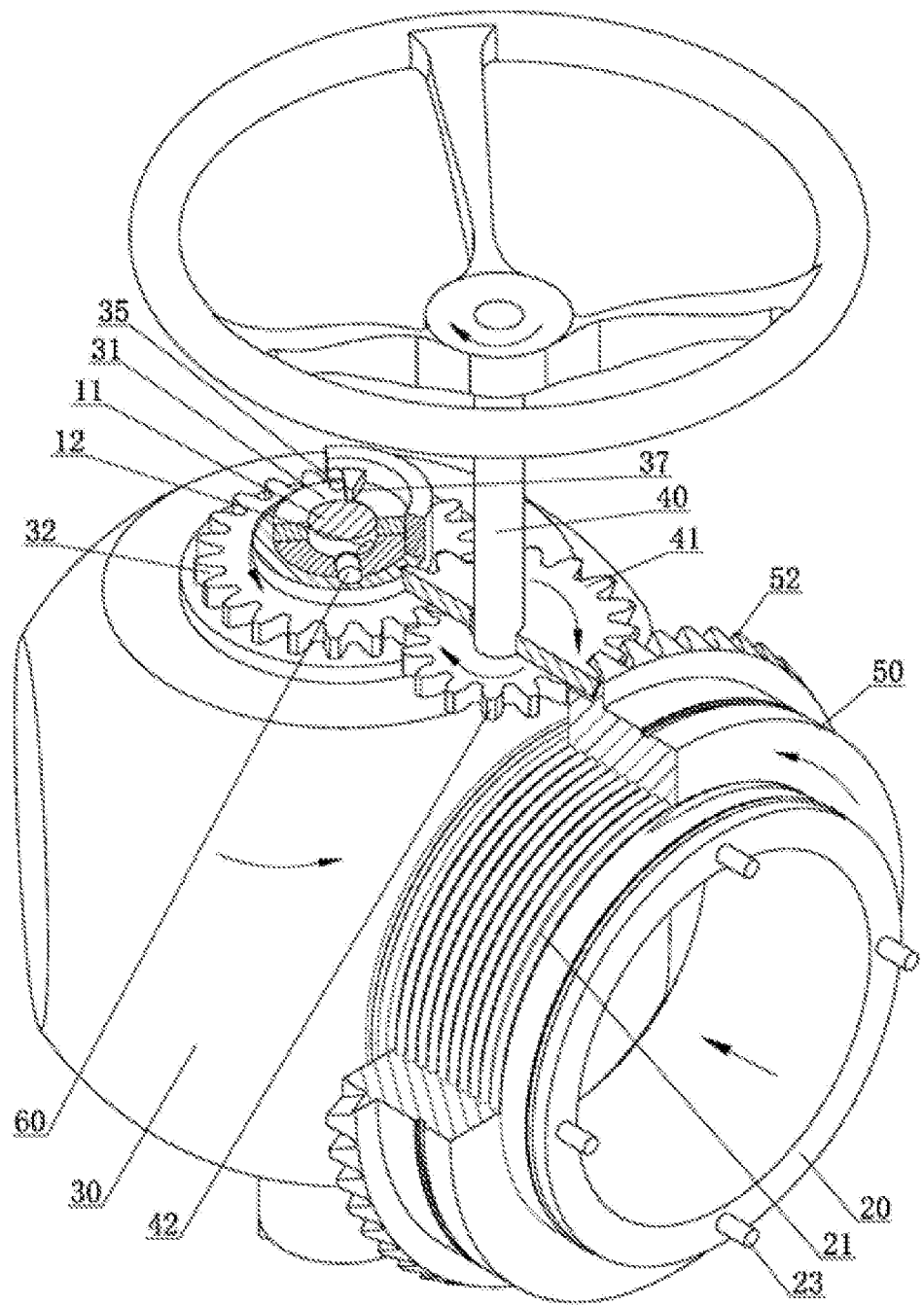
FIG. 5 is a schematic view showing the rotation of the ball from an open position to a closed position.
Figure 6:
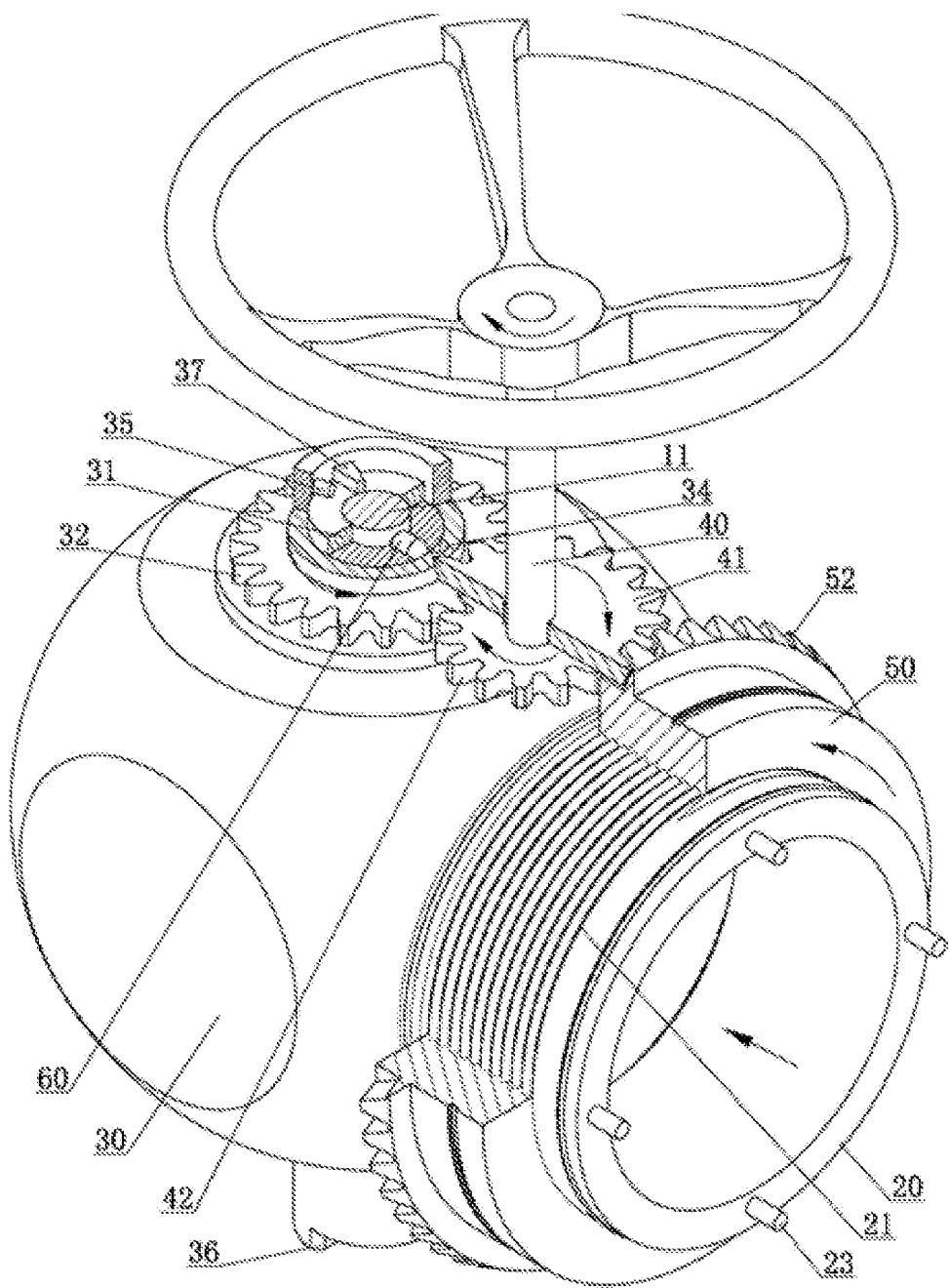
FIG. 6 is a schematic view showing the ball reaches to the closed position, the stem continues to drive the valve seat.
Figure 7:
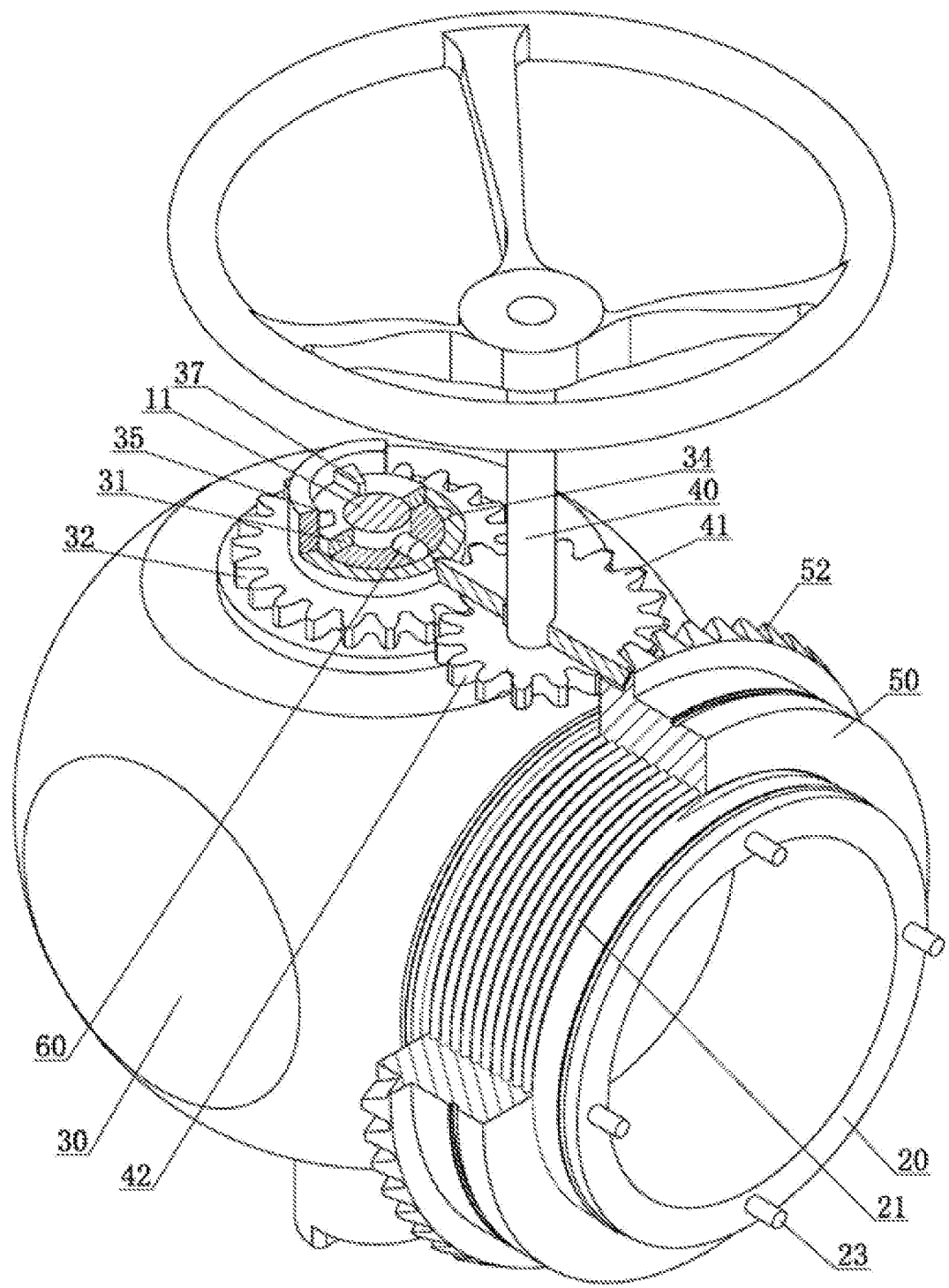
FIG. 7 is a schematic view showing the state in which the valve seat pressed against the ball.
Figure 8:
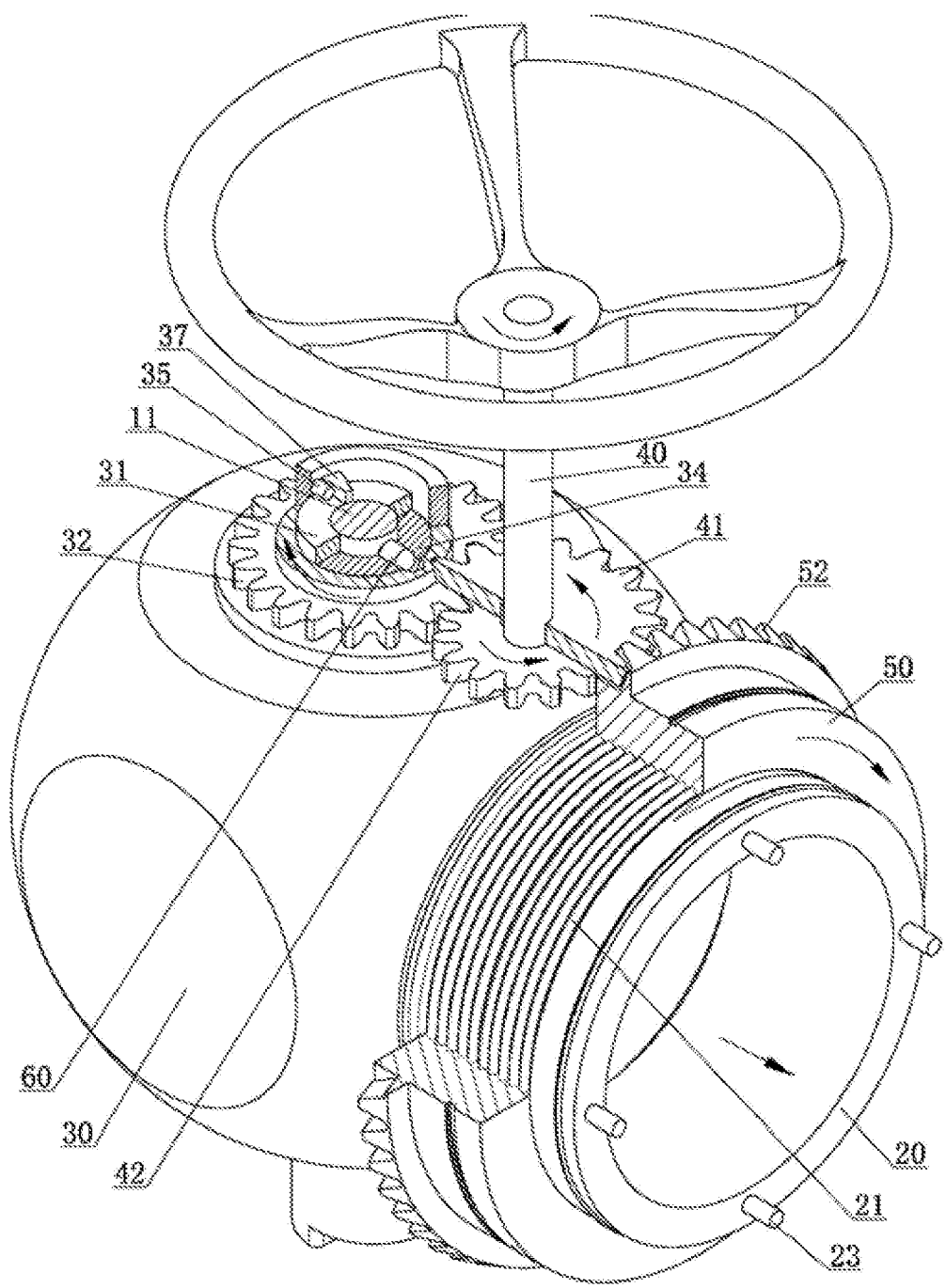
FIG. 8 is a schematic view of the valve seat being moved away from the ball, and the stem starts to rotate the ball to the opening direction through the drive block.
Figure 9:
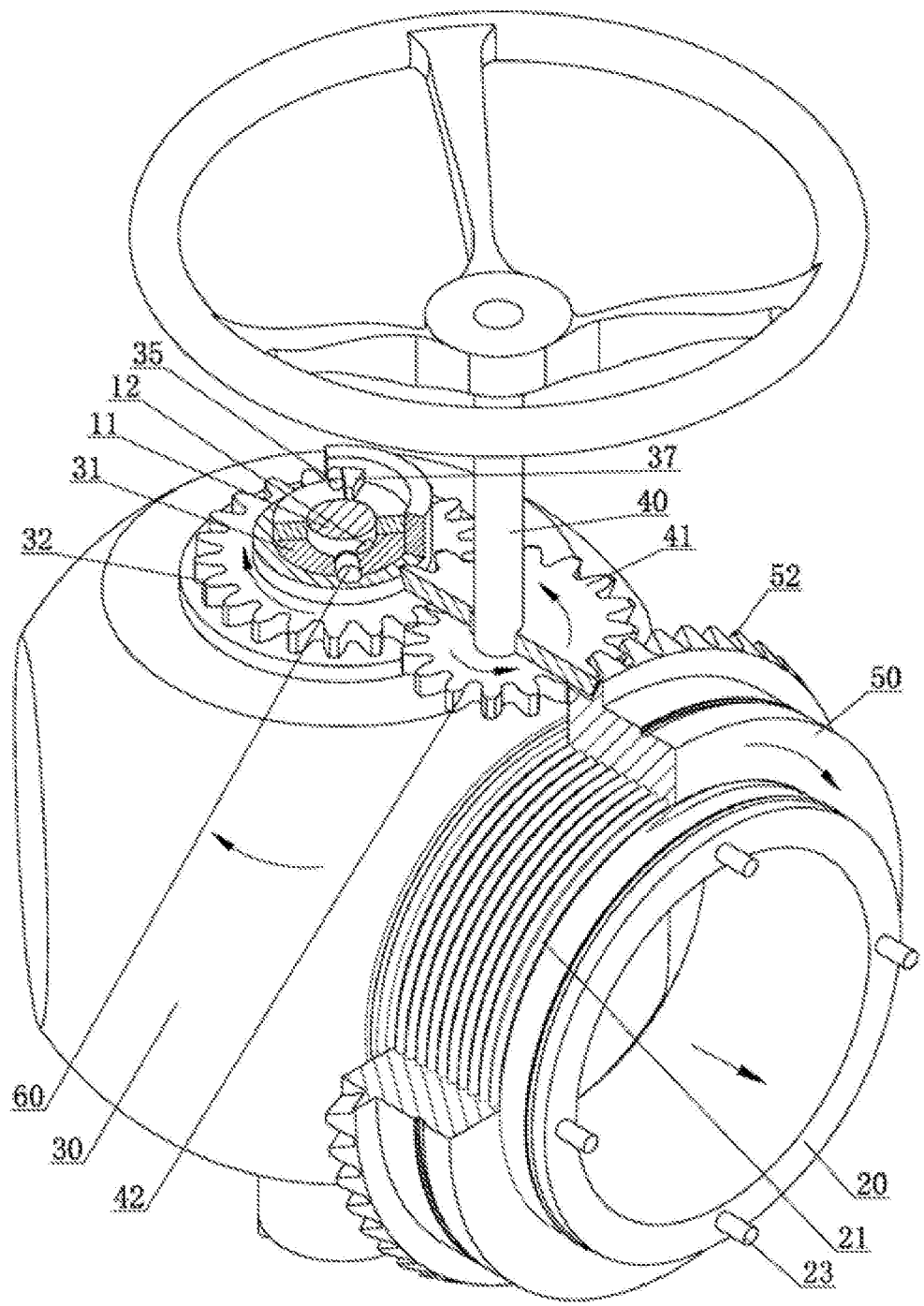
FIG. 9 is a schematic view showing the stem driving ball starting to rotate to opening direction.

The stem drives the ball to rotate to close via the locking object 60; when the ball rotates from the open position to the closed position (as shown in FIGS. 4 and 5), the locking object locks the connection relationship of the stem and the ball causes the stem to drive the ball to rotate. When the ball is reached the closed position (as shown in FIG. 6), the locking object unlocks the connection relationship between the stem and the ball, and the ball is locked in the closed position, the stem continues to drive the first seat to move, the first seat is pressed against the ball; while opening operation, the stem drives the first seat to move away from the ball (as shown in FIG. 7 and FIG. 8), and after the first seat is moved away from the ball, the locking object unlocks the ball at the closed position and locks the connection relationship between the stem and the ball (as shown in FIG. 9), and the stem drives the ball to rotate to the open position.

The stem is provided with a first pinion 41 and a second pinion 42. The first seat drive ring is provided with a first gear 52, and the first pinion meshes with the first gear; a ball upper sleeve 31 is provided, the inner hole of the valve sleeve is rotatably mounted in an upper shaft 11, and the outer cylinder surface of the valve sleeve is rotatably mounted with the third gear 32. The second pinion meshes with the third gear; the sleeve wall of the upper sleeve of the ball is provided with a first through hole 33, and the inner side of the shaft hole of the third gear is provided with a first recessed hole 34 with a position corresponding to the first through hole, the outer cylindrical surface of the upper shaft is provided with a second recessed hole 12 with its position corresponding to the first through hole; the locking object is mounted in the first through hole with clearance fit, the length L of the locking object is greater than the wall thickness K of the ball upper sleeve; the third gear is provided with driven block 35 for driving the ball to rotate to open direction.

The locking object 60 is a cylindrical pin with a ball end at both ends (as shown in FIG. 1 to FIG. 10), and the first through hole 33 of the sleeve wall of the upper sleeve of the ball is a cylindrical through hole corresponding to the outer diameter of locking object, a first recessed hole 34 of the third gear is a spherical recessed hole corresponding to the ball end of the locking object, and the second recessed hole 12 of the upper shaft is a spherical recessed hole corresponding to a ball end of the locking object.

Figure 11:
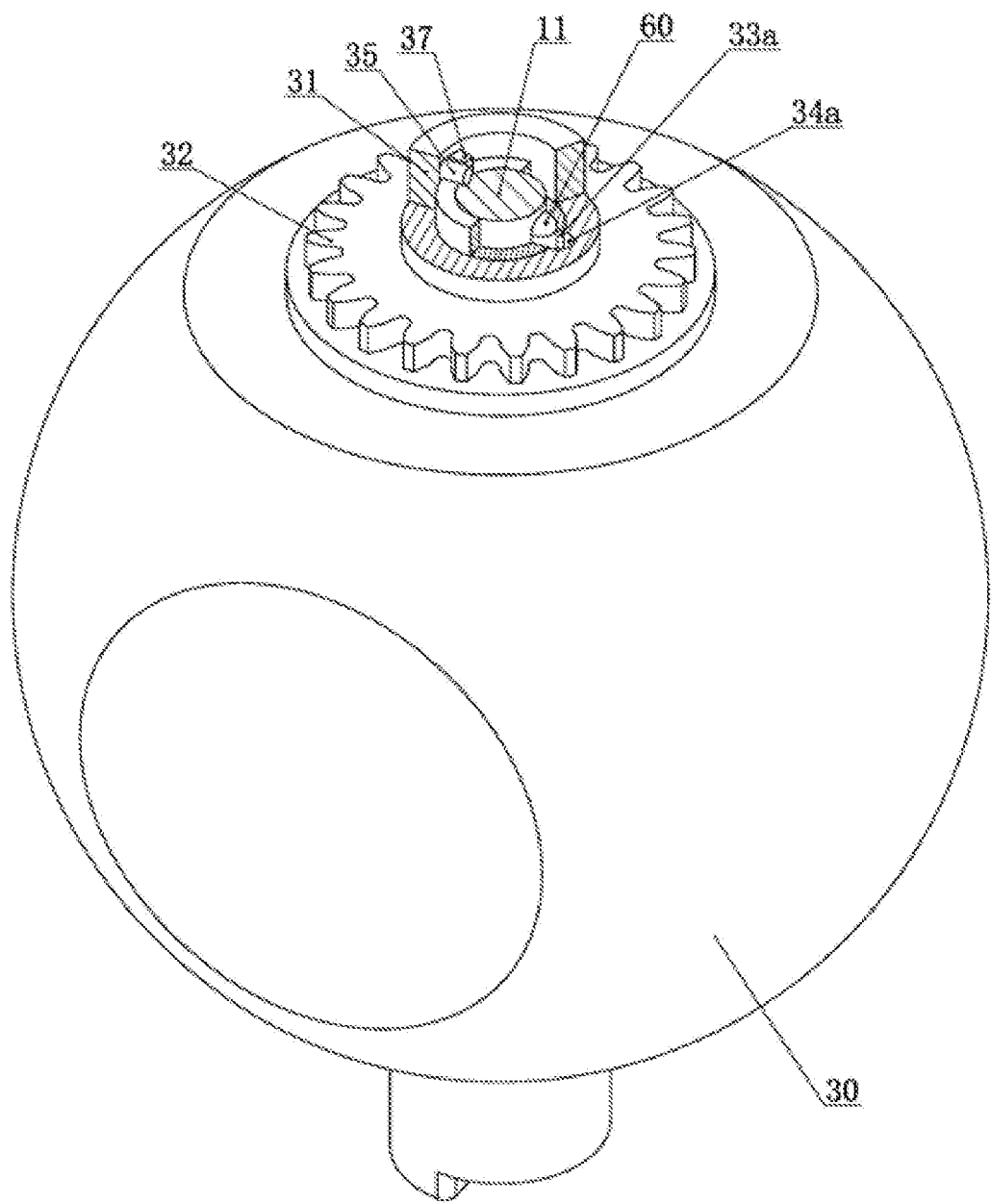
FIG. 11 is a structural view of the rotating portion of the ball of the disclosure, the locking object is a cylindrical pin having a ball end at both ends, and the axis of the locking object is parallel to the rotation axis of the stem.
Figure 12:
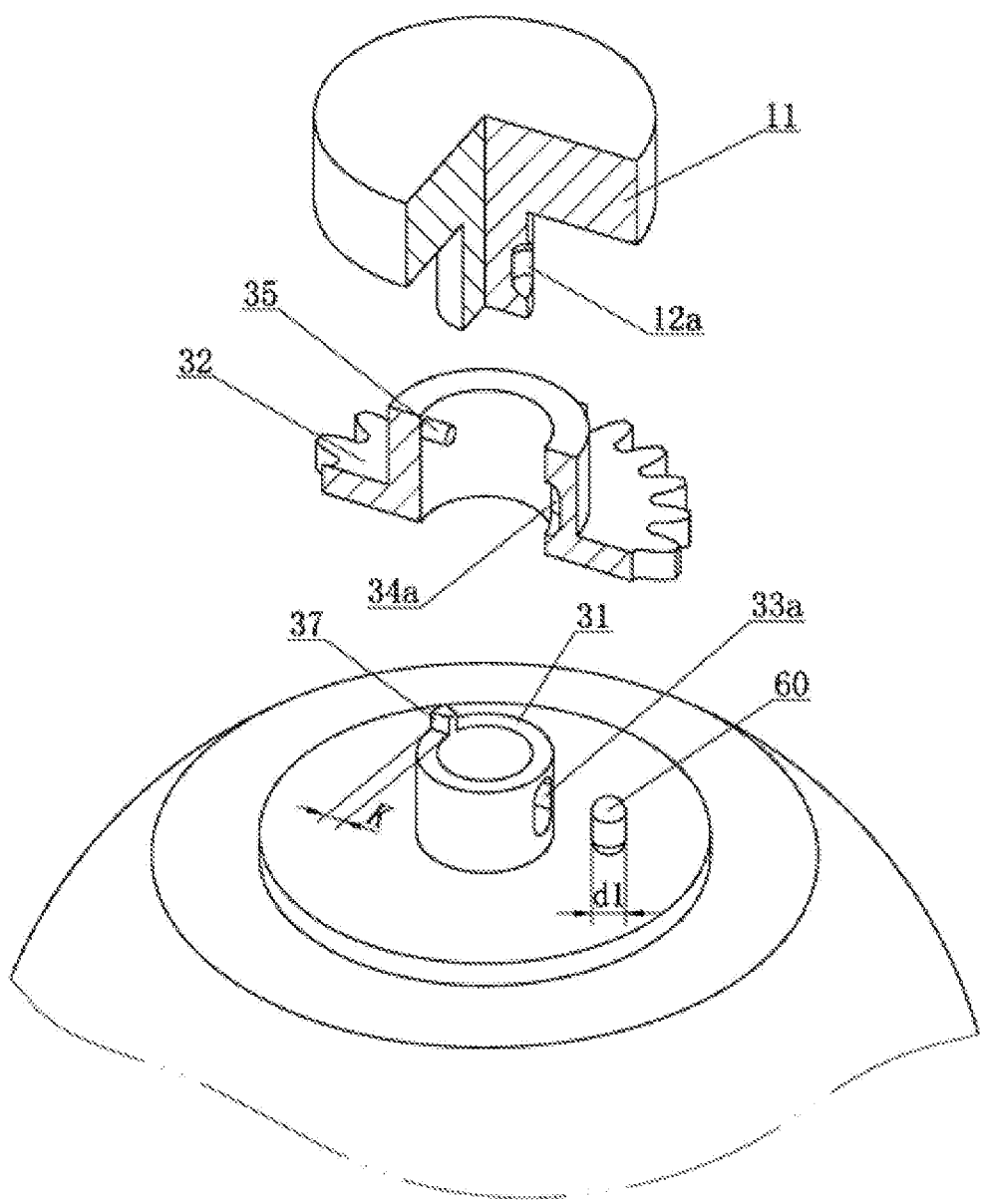
FIG. 12 is an exploded view of the structure of FIG. 11.

As shown in FIG. 11 and FIG. 12, the locking object 60 is a cylindrical pin with a ball end at both ends, the axis of the locking object is parallel to the rotation axis of the stem, The first through hole 33a is an elongated hole corresponding to the cylindrical locking object with the ball ends, and the first recessed hole 34a is an elongated concave hole corresponding to the cylindrical locking object with the ball ends, a second concave hole 12a of upper shaft is an elongated concave hole corresponding to the cylindrical locking object with the ball ends, and the diameter d1 of the locking object is larger than the wall thickness of the sleeve on the ball.

Figure 13:
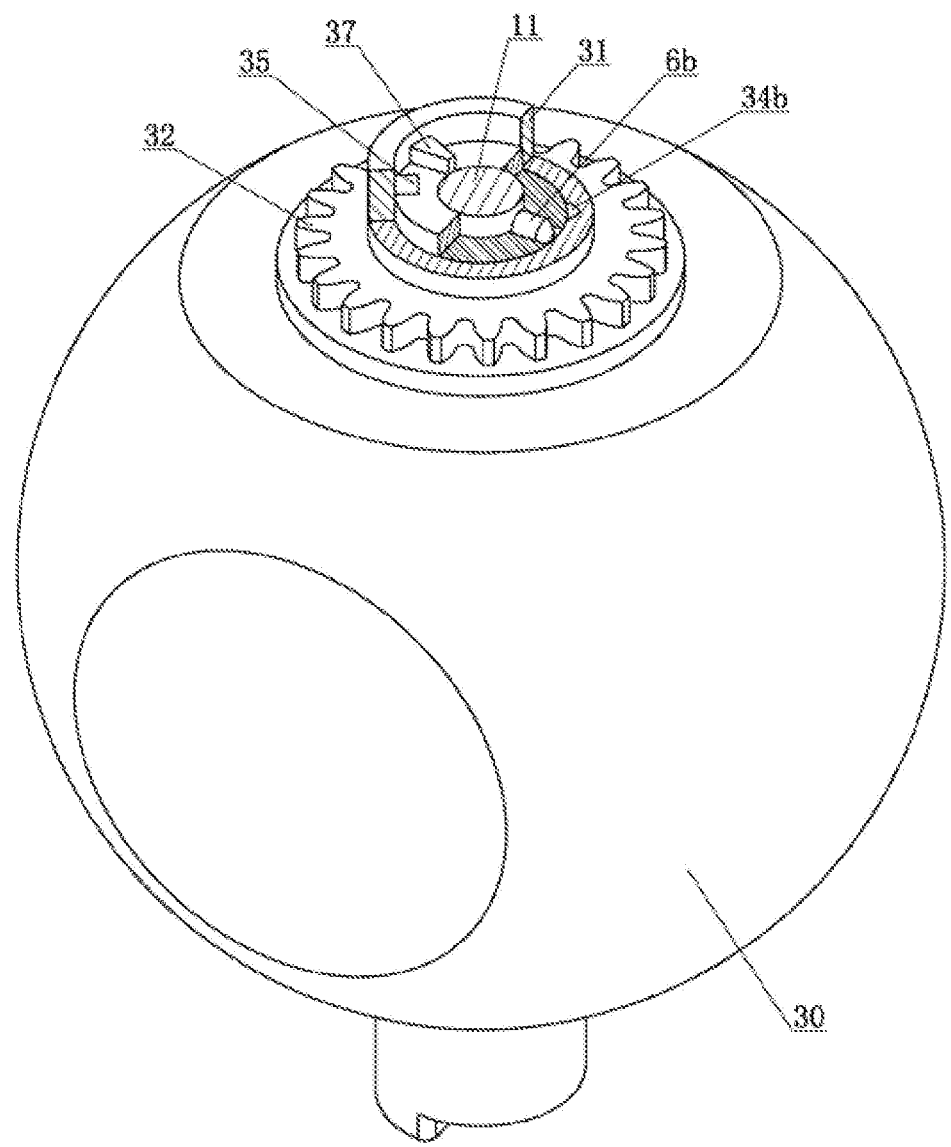
FIG. 13 is a structural view of the rotating portion of the ball, the locking object is a cylindrical pin having a tapered end.
Figure 14:
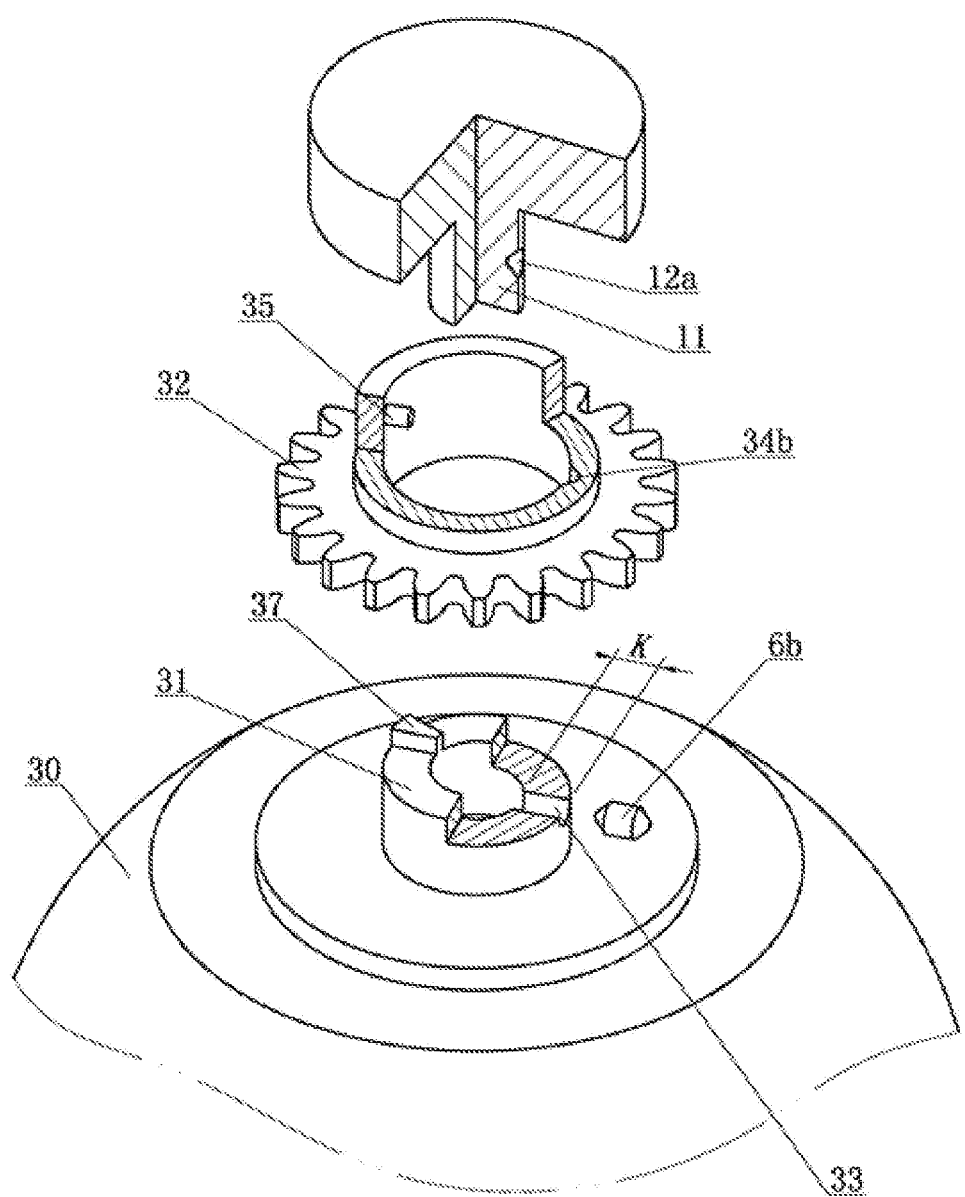
FIG. 14 is an exploded view of the structure of FIG. 13.

As shown in FIGS. 13 and 14, the locking object is a cylindrical pin 6b having tapered ends at both ends, and the first recessed hole 34b of the third gear is a tapered recessed hole corresponding to the tapered head of the locking object. The second recessed hole 12b of the upper shaft is a tapered recessed hole corresponding to the tapered head of the locking object.

Figure 17:
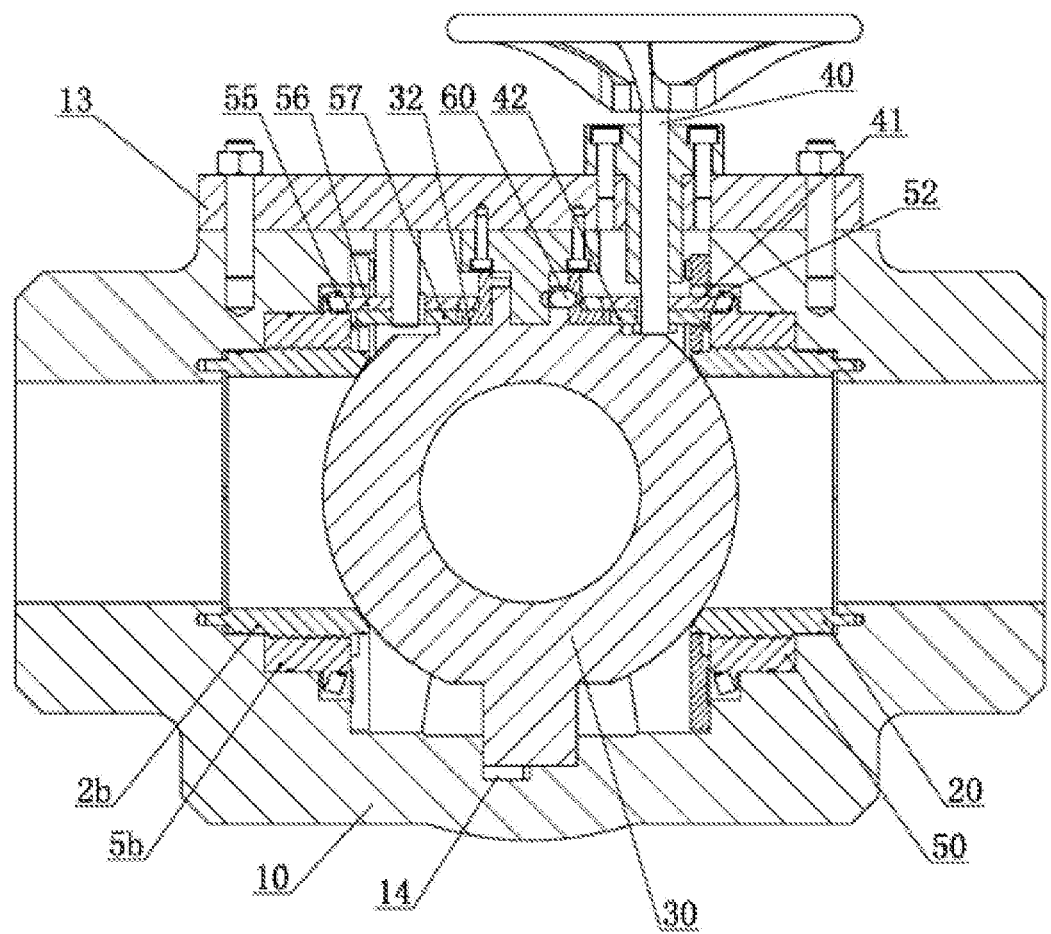
FIG. 17 is a structural view of a valve seat having forced seal on both the medium inlet side and the medium outlet side of the ball valve.

As shown in FIG. 17, the valve seat driven forced seal ball valve is provided with a second seat 2b and a second seat driving ring 5b, and the second seat driving ring is provided with a second gear 55, the second gear meshes with a fourth pinion 56 that rotates synchronously and coaxially with a fifth pinion 57 that meshes with the third gear 32, the first seat and the second valve seat is pressed against the ball when the valve seat drive forced seal ball valve is closed.

Figure 18:
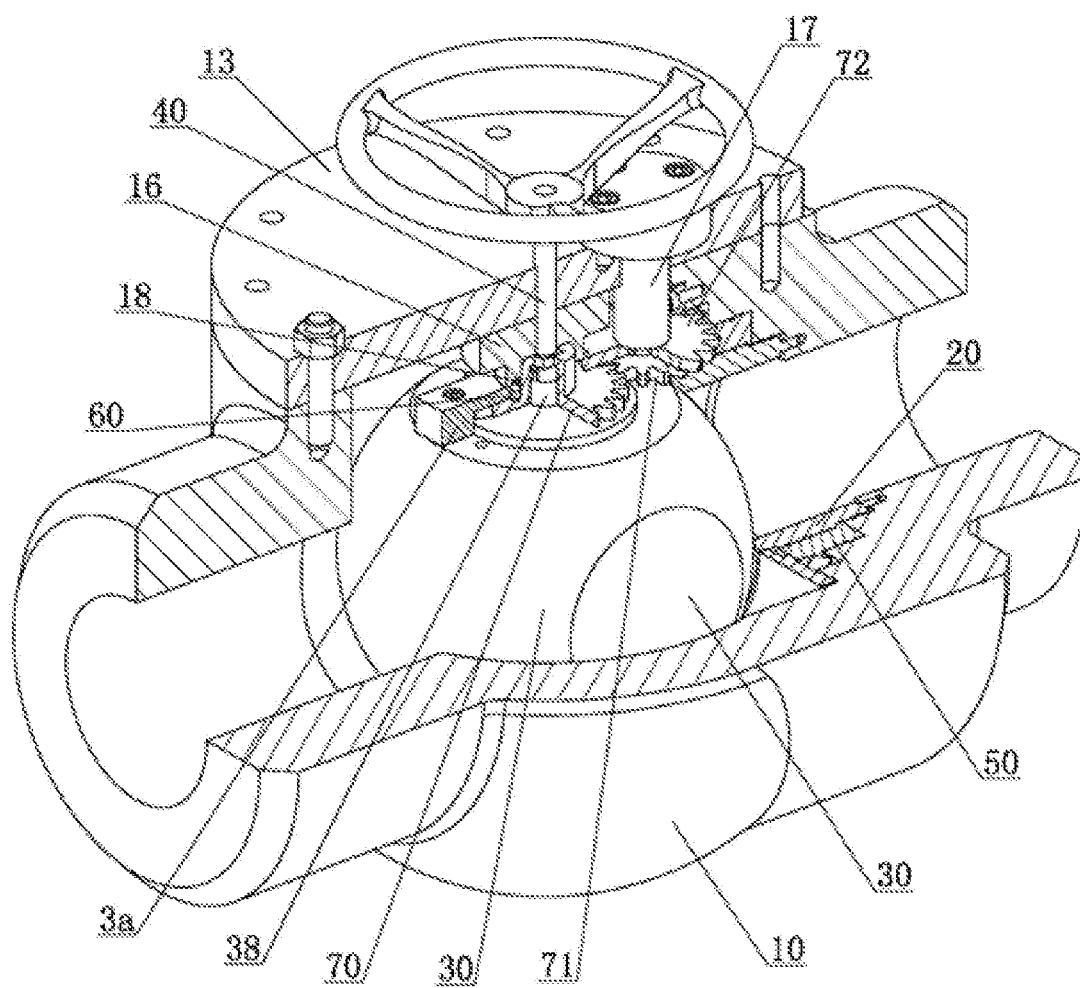
FIG. 18 is a structural view of the stem axis coaxial with the axis of rotation of the ball.
Figure 19:
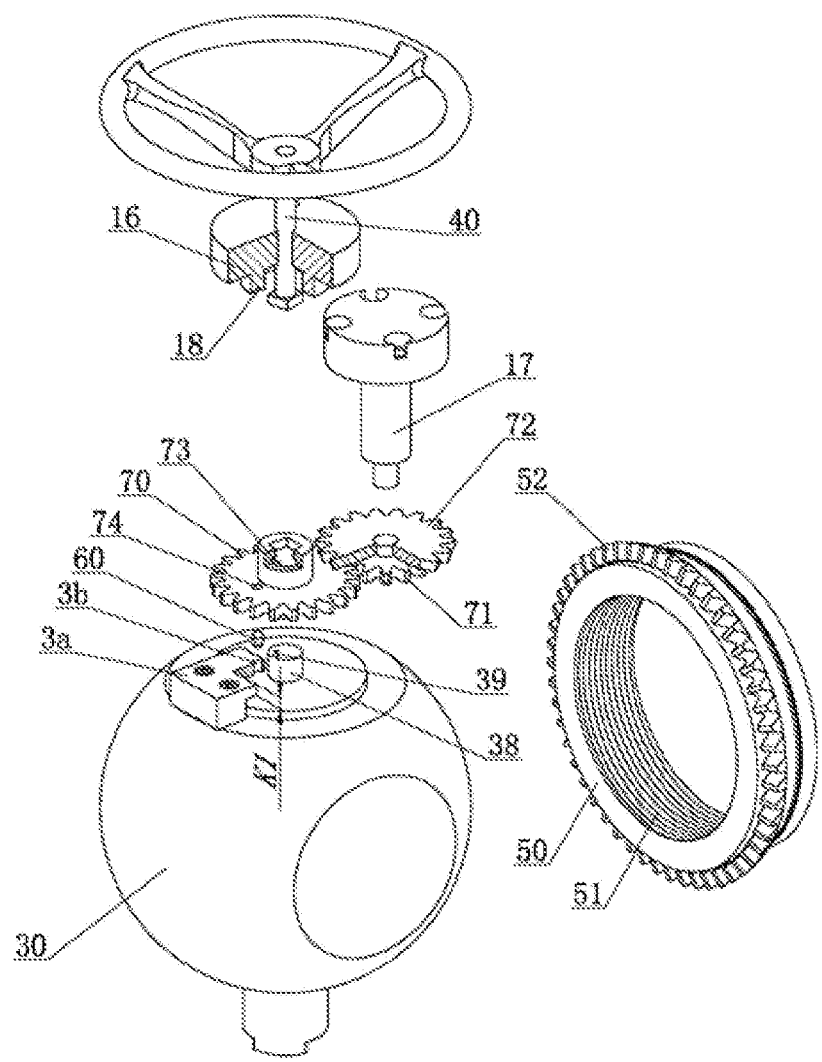
FIG. 19 is an exploded view of the transmission portion of FIG. 18.

As in FIGS. 18 and 19, the stem 40 is coaxial with the shaft of the ball 30, and the stem is provided with a sixth gear 70. The sixth gear is rotatably mounted in a bearing housing 16, The sixth gear is meshed with a seventh gear 71, the first seat drive ring 50 is provided with a first gear 52, the first gear is meshed with an eighth gear 72, the seventh gear and the eight-gear coaxially rotates synchronously; the ball is provided with a ball upper shaft 38, the ball upper shaft is rotatably mounted with the sixth gear, and the top of the ball upper shaft is provided with a convex block 39, the inner hole of the sixth gear is provided with a drive block 73 with function of driving the ball to rotate toward the opening direction, the ball is provided with a ball drive plate 3a, and the ball drive plate is provided with a second through hole 3b, the top of the sixth gear is provided with a third recessed hole 74 corresponding to the second through hole, and the bottom of the bearing housing is provided with a fourth recessed hole 18 with its position corresponding to the second through hole; the locking object 60 is mounted in the second through hole with a clearance fit.

The length of the locking object is approximately equal to the depth of the third recessed hole plus the depth of the second through hole; the diameter of the spherical locking object is approximately equal to the depth of the fourth recessed hole plus the depth of the second through hole.

The second through hole is aligned with the fourth recessed hole when the ball is in the fully closed position. When the ball is in other positions, the second through hole is aligned with the third recessed hole. The second through hole is simultaneously aligned with the third recessed hole and the fourth recessed hole only when the locking object switches position.

Embodiment 1

As shown in FIGS. 1 to 9, a valve seat driven forced seal ball valve, including a valve body 10, a first seat 20, a ball 30, and a stem 40. The first seat is driven by the first seat drive ring 50 inward and outward with respect to the ball.

The first seat 20 is a valve seat located at a medium inflow end of the valve. Optionally, the first seat is provided with a rotation stopper such as four rotation stopper pins 23, and is connected with the valve body, and the first seat is provided with male thread 21, and a seal ring 22 is disposed between the first seat and the valve body.

The first seat drive ring is provided with a female thread 51, and the first seat drive ring drives the first seat inward and outward with respect to the ball by a screw connection, and the first seat drive ring is provided with a first gear 52, the first gear is a bevel gear. A first drive ring cover 58 is mounted to the gear side of the first seat drive ring.

The stem is perpendicular to the axis of the first seat, and the stem extends from the valve body upper cover 13 into the valve body. The stem is provided with a first pinion 41 and a second pinion 42. The first pinion and the second pinion rotate synchronously with the stem. The first pinion is a bevel pinion and the first pinion meshes with the first gear.

The ball is mounted in the valve body, and the lower end of the ball is provided with a scalloped projection 36. The valve body is provided with a lower shaft chamber 14 corresponding to the lower shaft of the ball, and the lower shaft chamber is provided with a limiting groove 15 corresponding to the scalloped projection of the lower shaft of the ball. The ball rotation is limited to 90°.

Figure 3:
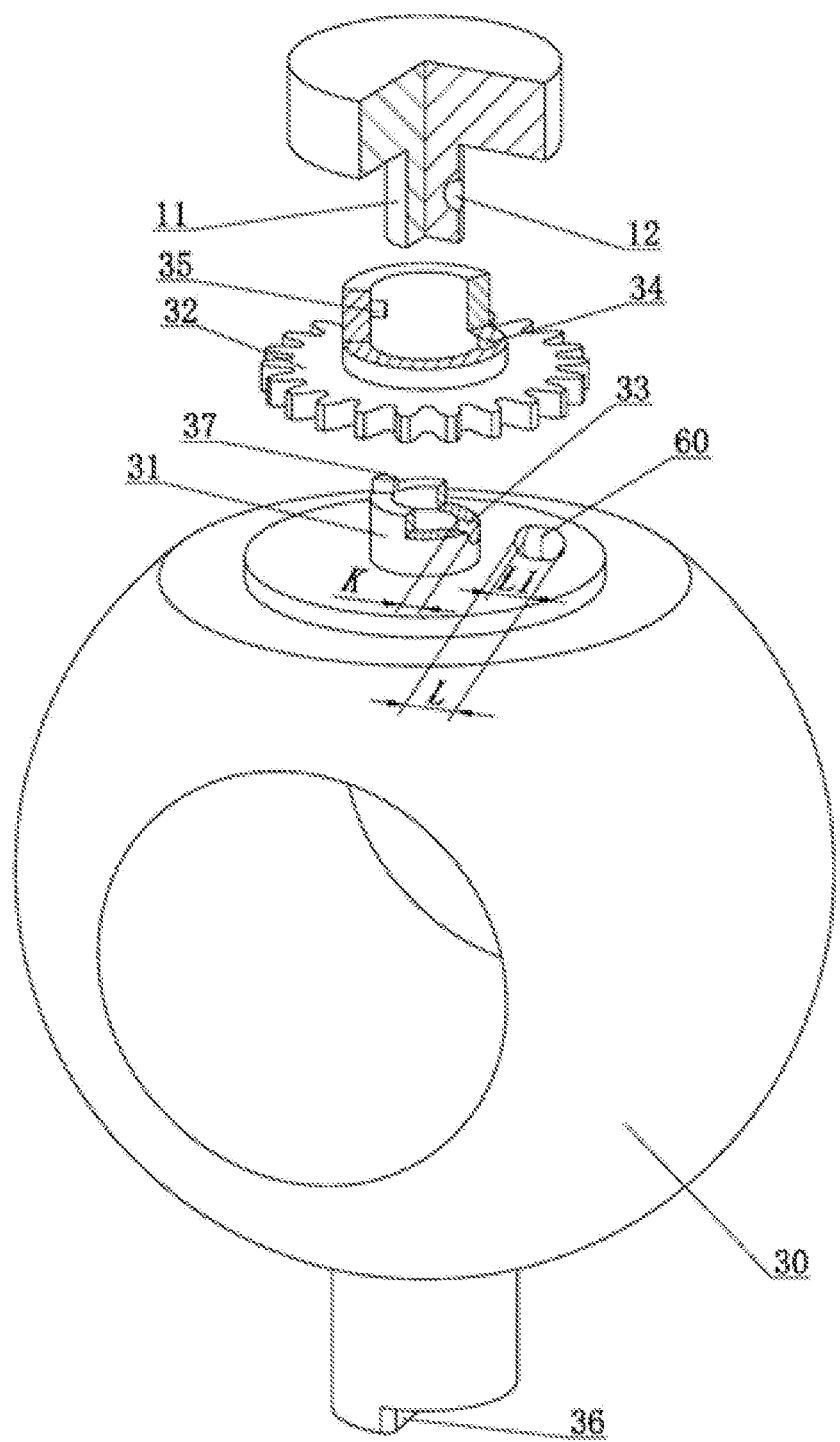
FIG. 3 is a structural view of a rotating portion of the ball of the disclosure.

The ball is provided with a ball upper sleeve 31, and the valve body upper cover is provided with an upper shaft 11, and the inner hole of the ball upper sleeve is rotatably mounted to the upper shaft. A third gear 32 is mounted on the outer cylindrical surface of the upper sleeve of the ball, and the second pinion meshes with the third gear; the sleeve wall of the upper sleeve of the ball is provided with a first through hole 33. The inner hole of the third gear is provided with a first recessed hole 34 corresponding to the first through hole, and the outer cylindrical surface of the upper shaft is provided with the second recessed hole 12 corresponding to the first through hole; the first through hole is mounted with a locking object 60 with clearance fit, the locking object can move reciprocally along the axis of the first through hole. The locking object is a cylindrical pin with ball ends in each end, and the first recessed hole 34 of the third gear is a spherical concave hole, and the depth of the spherical concave hole is equal to the radius of the ball end of the locking object. The second recessed hole 12 of the upper shaft is a spherical concave hole, and the depth of the spherical concave hole is also equal to the radius of ball end of the locking object. The wall thickness K of the sleeve on the ball is slightly larger than the sum of the length of the cylindrical section of the locking object and the radius of a ball end (as shown in FIG. 3). The locking object can be located in the space formed by the first through hole 33 and the first recessed hole 34. At this time, the sleeve on the ball is locked in synchronization with the third gear (that is, the ball rotates synchronously with the third gear). The locking object can also be located in the space formed by the first through hole 33 and the second recessed hole 12. At this time, the upper sleeve of the ball is locked to the upper shaft, and the third gear can rotate independently to the ball and the upper sleeve. The top of the upper sleeve of the ball is provided with a convex block 37, and the third gear is provided with a drive block 35, and the drive block 35 of the third gear drives the convex block 37 to rotate the ball valve in the opening direction.

The stem drives the ball to rotate from open to close by the locking object 60; when the ball is in the open position, as shown in FIG. 4, the locking object is trapped in the space formed by the first through hole 33 and the first recessed hole 34. The force of the first recessed hole applied on the locking object has two component forces, and the component force one drives the locking object to rotate, and the component force two pushes the locking object away from the first recessed hole. When trapped in the space formed by the first through hole 33 and the first recessed hole 34, the component force two is balanced by the outer surface of the upper shaft 11, so that the locking object locks the sleeve on the ball and the third gear, when the ball is driven to close the ball valve, the ball rotates from the open position to the closed position (as shown in FIG. 4 and FIG. 5), and the stem drives the ball to rotate synchronously. When the ball reaches to the closed position (as shown in FIG. 6), the limiting groove 15 of the valve body stops the rotation of the ball, and the first recessed hole 34 and the first through hole 33 of the sleeve on the ball simultaneously rotates to a position aligned with the second recessed hole 12 of the upper shaft, the stem is continuously rotated, and at this time, the component force one is balanced by the stop of the valve body limiting groove 15, the component force two will push the locking object moving away from the first recessed hole along the first through hole and entering the space formed by the first through hole 33 and the second recessed hole 12, the locking object releases the lock of the stem and the ball, and the ball and the upper shaft 11 is locked to keep the ball in the closed position. When the stem continues to rotate, the third gear rotates on the sleeve of the ball, and the stem drives the first seat drive ring 50 to rotate through the first pinion. The first seat drive ring drives the first seat to press the ball through the thread. As shown in FIG. 7.

During the opening of the valve seat driven forced seal ball valve, the stem first drives the first seat through the first seat driving ring to move away from the ball (as shown in FIGS. 7 and 8). At this moment, the third gear rotates on the sleeve of the ball, it does not drive the rotation of the ball because the locking object is trapped in the space formed by the first through hole 33 and the second recessed hole 12. After the first seat is moved away from the ball and reaches a predetermined gap, the first recessed hole 34 of the third gear rotates to a position aligned with the first through hole 33 of the sleeve on the ball, as shown in FIG. 8. At the same time, the drive block 35 of the third gear starts to drive the convex block 37 to rotate the sleeve on the ball to the opening direction. And the force of the second recess applied on the locking object when the sleeve on the ball rotates, causes the locking object to come out the second recessed hole 12 of the shaft, and enters into the space formed by the first through hole 33 and the first recessed hole 34, and the locking object relocks the third gear and the sleeve on the ball, as shown in FIG. 9. The stem continues to rotate until the ball is driven to the open position.

In this embodiment, the stroke of the stem is greater than the rotation stroke of the ball, and the stem drives the ball and the first seat simultaneously in the opening and closing stroke of the ball rotation, and the ball and the first seat have a gap at this stage. The ball can be easily rotated. After the ball reaches the closed position, there is still a gap between the first seat and the ball. The continued rotation of the stem will only drive the linear movement of the first seat, thereby realizing the forced sealing of the ball valve, and the rotation of the ball friction free from the seat.

Embodiment 2

A valve seat driven forced seal ball valve, which is an improvement of a valve seat driven forced seal ball valve according to the first embodiment.

As shown in FIG. 10, in this embodiment, a toothed roller 53 and a cage 54 are disposed between the female thread of the first seat drive ring and the male thread of the first seat, and the toothed roller is disposed in the cage. The toothed roller simultaneously meshes with the female thread of the first seat drive ring and the male thread of the first seat.

In this embodiment, the roller is used to realize the transmission between the first seat drive ring and the first seat thread, and the sliding friction between the threads is improved to the rolling friction of the roller, which can significantly reduce the operating torque of the ball valve. There are significant advantages in large size, high pressure pipelines.

Embodiment 3

A valve seat driven forced seal ball valve. This embodiment is a structural replacement of a valve seat driven forced seal ball valve according to the first embodiment.

As shown in FIG. 11 and FIG. 12, the locking object 60 is a cylindrical pin having a ball end at both ends, the axis of the locking object is parallel to the rotation axis of the stem, and the first through hole 33a of the sleeve wall of the sleeve on the ball is semi-circular both ends long hole corresponds to the profile of the locking object. The first recessed hole 34a of the third gear is a long recessed hole, with spherical surface at both ends, corresponding to the profile of the locking object. Similar to the first recessed hole, the second recessed hole 12a of the upper shaft is a long recessed hole corresponding to the profile of the locking object. In order to enable the locking object to respectively lock the ball and the third gear, and the ball and the upper shaft, the cylindrical diameter d1 of the locking object is greater than the wall thickness of the sleeve on the ball. In this embodiment, the wall thickness of the sleeve on the ball is K is slightly larger than the cylindrical radius of the locking object.

Embodiment 4

As shown in FIG. 13 and FIG. 14, a valve seat driven forced seal ball valve. This embodiment is a structural replacement of a valve seat driven forced seal ball valve according to the first embodiment.

In this embodiment, the locking object is a cylindrical pin 6b having a tapered head at both ends, and the first recessed hole of the third gear is a tapered recessed hole 34b corresponding to the tapered head of the locking object, and the second recessed holes 12b of upper shaft are tapered recessed holes corresponding to the tapered head of the locking object.

The length of the locking object is greater than the wall thickness K of the sleeve on the ball, and the length of the locking object is approximately equal to the sum of the wall thickness of the sleeve on the ball and the depth of the first recessed hole, and the length of the locking object is also approximately equal to the sum of the wall thickness of the sleeve of the upper shaft of the ball and the depth of the second recessed hole; enabling the locking object to enter into the space formed by the first through hole 33 and the first recessed hole 34b, and also into the space formed by the first through hole 33 and the second recessed hole 12b.

Embodiment 5

Figure 15:
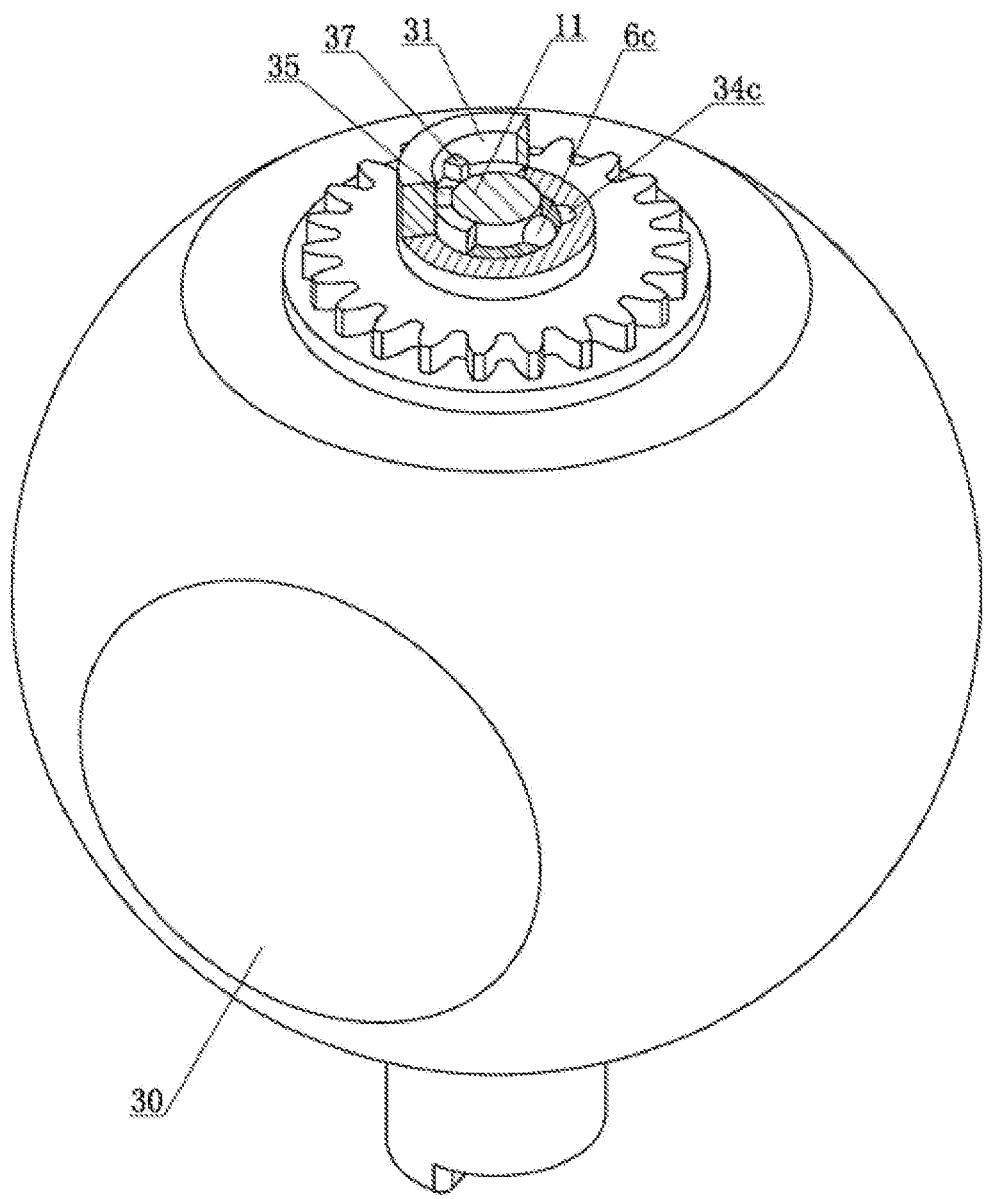
FIG. 15 is a structural view of the rotating portion of the ball, the locking object is a spherical locking object.
Figure 16:
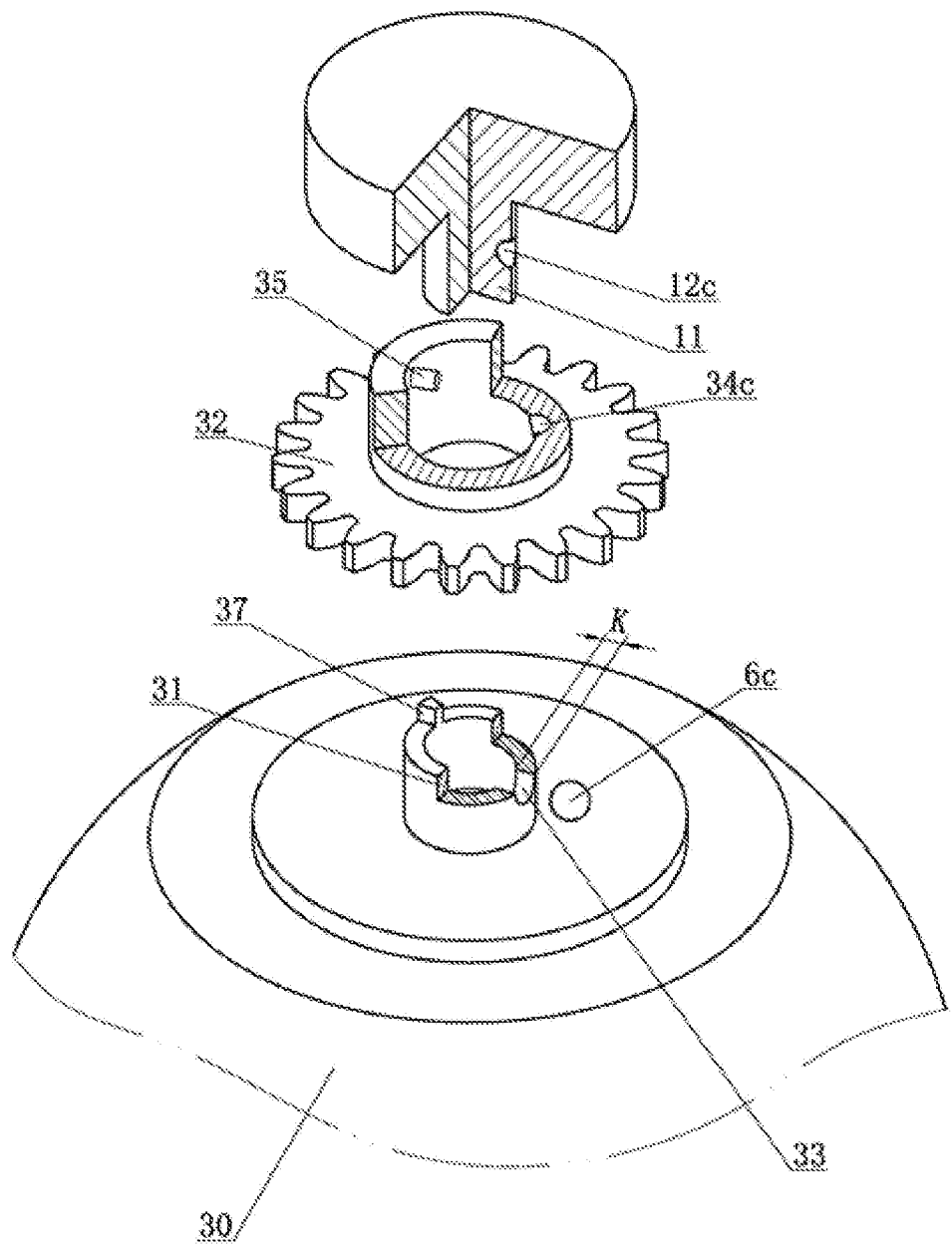
FIG. 16 is an exploded view of the structure of FIG. 15.

As shown in FIG. 15 and FIG. 16, in the present embodiment, the locking object 6c is a ball, and the first recessed hole 34c of the third gear is a hemispherical concave hole corresponding to the spherical shape of the locking object, and the second recessed hole 12c is a hemispherical concave hole corresponding to the spherical shape of the locking object.

In order to enable the locking object to respectively lock the ball and the third gear, and the ball and the upper shaft, the diameter of the spherical locking object is greater than the wall thickness of the sleeve on the ball. In this embodiment, the wall thickness K of the sleeve on the ball is slightly larger than the spherical radius of the locking object, the locking object can enter the space formed by the first through hole 33 and the first recessed hole 34c, and can enter the space formed by the first through hole 33 and the second recessed hole 12c.

Embodiment 6

A valve seat driven forced seal ball valve. This embodiment is a structural extension of a valve seat driven forced seal ball valve according to the first embodiment.

As shown in FIG. 17, in the embodiment, the valve seat includes a first seat 20 and a second seat 2b. The first seat and the second seat are respectively disposed on the medium inlet side and the medium outlet side of the ball valve. The valve seat drive ring includes a first seat drive ring 50 for driving the first seat and a second seat drive ring 5b for driving the second seat, the first seat drive ring is provided with a first gear 52, and the second seat drive ring is provided with a second gear 55, the second gear is meshed with a fourth pinion 56, the fourth pinion rotates coaxially with a fifth pinion 57, and the fifth pinion meshes with the third gear 32. The first seat and the second seat are simultaneously pressed against the ball when the valve seat driven forced seal ball valve is closed.

In this embodiment, the stem drives the second seat through the second pinion 42, the third gear 32, the fifth pinion 57 and the fourth pinion 56, so that the medium inlet and medium outlet valve seat are simultaneously sealed with the ball, enhanced the closing performance of the ball valve. It is also possible to keep the valve cavity between the two valve seats isolated from the medium after being closed, and to perform maintenance work such as flushing.

Embodiment 7

A valve seat driven forced seal ball valve, this embodiment is a structural change of the valve seat driven forced seal ball valve according to the first embodiment.

As shown in FIG. 18 and FIG. 19, the valve seat driven forced seal ball valve includes a valve body 10, a first seat 20, a ball 30 and a stem 40. The first seat is driven by the first seat driving ring 50 inward and outward with respect to the ball. The first seat 20 and the first seat drive ring 50 are the same as in the first embodiment. In this embodiment, the stem 40 is coaxial with the rotation axis of the ball 30, and the end of the stem is provided with a sixth gear 70. The end of the stem passes through a bearing housing 16 to drive the sixth gear to rotate via a square head. The sixth gear is mounted in the inner bore of the bearing housing 16 and rotatable. The sixth gear is meshed with a seventh gear 71, and the first seat drive ring 50 is provided with a first gear 52, the first gear 52 is meshed with an eighth gear 72, and the seventh and eighth gears are mounted on an intermediate transmission shaft 17, which acts as an intermediate transmission gear and can rotate simultaneously and coaxially.

The ball is provided with a ball upper rotating shaft 38, and the sixth gear wheel is mounted at the ball upper rotating shaft, rotatable, and the top of the ball upper rotating shaft is provided with a convex block 39, and the inner hole of the sixth gear is provided with a drive block 73, drives the convex block 39, and rotate the ball valve to the opening direction. The ball is provided with a ball drive plate 3a. The ball drive plate is placed between the bearing seat 16 and the sixth gear 70. The ball drive plate is provided with a second through hole 3b, and the axis of the second through hole is parallel to The axis of rotation of the ball. A locking object is disposed in the second through hole. The locking object of this embodiment uses the cylindrical pin 6a with the ball ends at both ends as described in the third embodiment. The upper end surface of the sixth gear is provided with a third recess hole 74 corresponding to the second through hole, and the lower end surface of the bearing housing is provided with a fourth recess hole 18 corresponding to the second through hole. The locking object 60 is disposed in the second through hole with a clearance fit. The length of the locking object is greater than the thickness of the ball drive plate, and the length of the locking object is approximately equal to the sum of the thickness of the ball drive plate and the depth of the third recessed hole. And, the length of the locking object is also approximately equal to the sum of the thickness of the ball drive plate and the depth of the fourth recess hole.

Similar to the valve seat driven forced seal ball valve of the first embodiment, the stem drives the ball to rotate by the locking object 6a. When the ball is in the open position, the locking object locks the ball drive plate and the sixth gear via the second through hole and the third recessed hole, on the valve close stroke, the stem drives the ball to rotate synchronously when the ball is rotating from open position to closed position. When the ball is reached to the closed position, the limiting groove 15 of the valve body (refer to FIG. 2) stops the rotation of the ball, and the third recessed hole 74 and the second through hole 3b are synchronously rotated to the position corresponding to the position of the four recessed holes 18 of the bearing housing. While the stem drives the sixth gear to continue to rotate, the third recessed hole 74 of the sixth gear pushes the locking object 6a, and the locking object enters the space formed by the second through hole 3b and the fourth recessed hole 18, the locking object releases the lock between the stem and the ball, and at the same time locks the ball drive plate 3a and the bearing housing 16. When the stem continues to rotate, the sixth gear rotates on the shaft 38 of the ball, the stem drives the seventh gear to rotate via the sixth gear, and the eighth gear synchronously rotated with the seventh gear drives the first seat drive ring 50 to rotate, and the first seat drive ring drives the first seat to move toward the ball through the thread, so that The first seat is pressed against the ball.

During the opening of the valve seat driven forced seal ball valve, the stem first drives the first seat through the first seat driving ring to move away from the ball. At this moment, the sixth gear rotates on the rotating shaft 38 of the ball, will not drive the ball to rotate. After the first seat is moved away from the ball and reached a predetermined gap, the sixth gear on the upper shaft of the ball is rotated to the position that the third recessed hole 74 of the sixth gear and the second through hole 3b and the fourth recessed hole 18 are all aligned. At the same time, the drive block 33 of the sixth gear starts to drive the convex block 39 of the upper shaft of the ball, and rotates the ball to the opening direction, and while the ball rotates, the locking object is pushed out of the forth recessed hole 18 of the bearing housing 16. The locking object enters the space formed by the second through hole 3b and the third recessed hole 74, and relocks the sixth gear and the ball drive plate. At this stage, the lower end surface of the bearing housing 16 restrains the locking object, and it is trapped in the space formed by the second through hole 3b and the third recessed hole 74. The stem continues to drive the ball to rotate until the ball is driven to the open position.

It should be noted that, in the embodiment, the sixth gear can also directly mesh with the first gear, and the seventh and eighth gears and the intermediate transmission shaft 17 are not essential structures and can be removed to make the whole mechanism more compact.

In addition, the embodiments exemplified in the disclosure are top-entry body. In fact, the technical solution of the disclosure is not limited by the form of the valve body, and the valve body may be side-entry or fully welded.

Equivalent elements can be substituted for the ones set forth above such that they perform in substantially the same manner in substantially the same way for achieving substantially the same result.

It is believed that the system and method as described and many of its attendant advantages will be understood by the foregoing description. It is also believed that it will be apparent that various changes may be made in the form, construction, and arrangement of the components thereof without departing from the scope and spirit of the invention or without sacrificing all of its material advantages. The form herein before described being merely exemplary and explanatory embodiment thereof. It is the intention of the following claims to encompass and include such changes.

What is claimed is:

1. A ball valve with single-action actuation and sealing, the ball valve comprising:
   a body;
   a ball assembly;
     the ball assembly rotatably connected to the body;
     the ball assembly including a ball;
     the ball assembly having an open position and a closed position;
   a seat assembly;
     the seat assembly including a sealing face;
     the seat assembly sliding linearly with respect to the body;
   a valve stem, the valve stem causing both rotation of the ball and motion of the sealing face;
   a seat drive ring with threads;
   a seat including threads;
     the threads of the seat drive ring interfaced with the threads of the seat;
   wherein rotation of the seat drive ring causes linear motion of the seat, and thus the sealing face and
   wherein when the ball assembly is in the open position, rotation of the valve stem rotates the ball to the closed position while simultaneously causing the sealing face to move linearly towards the ball, the sealing face to pressing against the ball after the ball has reached the closed position.

2. The ball valve of claim 1, further comprising:
   a cage containing a multiplicity of rollers;
     the cage between the seat and the seat assembly;
     the multiplicity of rollers interfacing with the threads of the seat drive ring and the threads of the seat assembly;
   whereby the multiplicity of rollers reduces the rotational resistance of the seat drive ring with respect to the seat assembly.

3. The ball valve of claim 1 further comprising:
a locking object;
the locking object controlling when the stem causes the ball to rotate;
wherein when moving the ball from the open position to the closed position, the locking object links the rotation of the stem and the ball assembly, thus rotation of the stem causing rotation of the ball assembly; and
wherein when the ball assembly reaches the closed position, the locking object unlinks the rotation of the stem and the ball assembly, allowing the stem to move only the seat assembly linearly toward the ball assembly, pressing the sealing face against the ball.

4. The ball valve of claim 3, wherein the locking object is a cylindrical pin.

5. The ball valve of claim 1, further comprising:
a rotation stopper placed between the seat assembly and the body;
the rotation stopper preventing rotation of the sealing face with respect to the body.

6. The ball valve of claim 1, wherein the valve stem is offset from a centerline of the ball assembly.

7. A ball valve with sequential ball actuation and seal actuation using a single valve stem, the ball valve comprising:
a ball, the ball having an open position and a closed position, the ball actuated by the single valve stem during a closure operation;
a sealing surface, the sealing surface moving inward and outward with respect to the ball, the sealing surface actuated by the single valve stem during a sealing operation;
the sealing surface pressing against the ball when in a sealed position;
the closure operation and the sealing operation being automatically sequenced depending upon the position of the ball;
a locking object;
the locking object controlling when the stem causes the ball to rotate;
wherein when moving the ball from the open position to the closed position, the locking object links the rotation of the stem and the ball, thus rotation of the stem causing rotation of the ball; and
wherein when the ball reaches the closed position, the locking object unlinks the rotation of the stem and the ball, allowing the stem to move only the seat assembly linearly toward the ball, pressing the sealing surface against the ball;
wherein when the ball is in the open position, rotation of the single valve stem causes the closure operation to occur as the sealing operation occurs, and upon the ball reaching the closed position, the closure operation stops, and continued rotation of the single valve stem causes the sealing operation to complete.

8. The ball valve of claim 7, further comprising a seat assembly comprising:
a seat drive ring with threads;
a seat including threads;
the sealing surface mechanically connected to the seat;
the threads of the seat drive ring interfaced with the threads of the seat;
wherein rotation of the seat drive ring causes linear motion of the seat, and thus the sealing surface.

9. The ball valve of claim 8, further comprising:
a cage containing a multiplicity of rollers;
the cage between the seat drive ring and the seat;
the multiplicity of rollers interfacing with the threads of the seat drive ring and the threads of the seat;
whereby the multiplicity of rollers reduces the rotational resistance of the seat drive ring with respect to the seat assembly.

10. The ball valve of claim 7, wherein the locking object is a cylindrical pin.

11. The ball valve of claim 8, further comprising:
a rotation stopper placed between the seat assembly and a body;
the rotation stopper preventing rotation of the sealing surface with respect to the body.

12. The ball valve of claim 7, wherein the valve stem is offset from a centerline of the ball.

13. A mechanical energized sealing ball valve, comprising:
a ball assembly;
a seat assembly;
a sealing member within the seat assembly;
a valve stem, the valve stem independent of any other valve stem;
the valve stem rotating the ball and operating the sealing member;
the valve stem connected to the sealing member by one or more gears;
wherein the valve stem is offset from a centerline of the ball assembly
wherein rotation of the valve stem first causes the ball to rotate between an open position and a closed position, and when the ball reaches the closed position, the continued rotation of the valve stem presses the sealing member against the ball.

14. The ball valve of claim 13, the seat assembly further comprising:
a seat drive ring with threads;
the seat further including threads;
the threads of the seat drive ring interfaced with the threads of the seat;
wherein rotation of the seat drive ring causes linear motion of the seat.

15. The ball valve of claim 14, further comprising:
a cage containing a multiplicity of rollers;
the cage between the seat drive ring and the seat;
the multiplicity of rollers interfacing with the threads of the seat drive ring and the threads of the seat;
whereby the multiplicity of rollers reduces the rotational resistance of the seat drive ring with respect to the seat assembly.

16. The ball valve of claim 13, further comprising:
a locking object;
the locking object controlling when the stem causes the ball to rotate;
wherein when moving the ball from the open position to the closed position, the locking object links the rotation of the stem and the ball assembly, thus rotation of the stem causing rotation of the ball assembly; and
wherein when the ball assembly reaches the closed position, the locking object unlinks the rotation of the stem and the ball assembly, allowing the stem to move only the sealing member, causing the seat assembly to move linearly toward the ball assembly, pressing the sealing member against the ball.

17. The ball valve of claim 14, further comprising:
a rotation stopper placed between the seat assembly and a body;

the rotation stopper preventing rotation of the sealing member with respect to the body.

* * * * *